US009718459B2

(12) United States Patent
Imamura et al.

(10) Patent No.: US 9,718,459 B2
(45) Date of Patent: Aug. 1, 2017

(54) HYBRID VEHICLE

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP); Toshiki Kanada, Anjo (JP); Hidehiko Banshoya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/997,299

(22) Filed: Jan. 15, 2016

(65) Prior Publication Data
US 2016/0236671 A1    Aug. 18, 2016

(30) Foreign Application Priority Data

Feb. 18, 2015 (JP) ................................. 2015-029437

(51) Int. Cl.
*B60W 20/14*    (2016.01)
*B60W 10/06*    (2006.01)
(Continued)

(52) U.S. Cl.
CPC ............ *B60W 20/14* (2016.01); *B60K 6/365* (2013.01); *B60K 6/387* (2013.01); *B60K 6/442* (2013.01); *B60K 6/445* (2013.01); *B60K 6/543* (2013.01); *B60W 10/06* (2013.01); *B60W 10/08* (2013.01); *B60W 10/10* (2013.01); *B60W 10/115* (2013.01); *B60W 20/20* (2013.01); *B60W 30/18127* (2013.01); *B60W 2510/081* (2013.01); *B60W 2510/104* (2013.01);
(Continued)

(58) Field of Classification Search
CPC ......... B60W 20/14; B60W 10/06; B60L 7/10; B60L 7/18; B60H 1/004; B60K 6/445; B60K 6/28; B60K 6/365; B60K 6/26
See application file for complete search history.

(56) References Cited

U.S. PATENT DOCUMENTS

| 8,480,522 B2 * | 7/2013 | Akutsu ..................... B60K 6/26 180/65.225 |
| 2013/0038271 A1 * | 2/2013 | Park ......................... B60K 6/28 320/104 |

(Continued)

FOREIGN PATENT DOCUMENTS

| JP | H06-117456 A | 4/1994 |
| JP | 2006-002913 A | 1/2006 |

(Continued)

Primary Examiner — Yuri Kan
(74) Attorney, Agent, or Firm — Oliff PLC

(57) ABSTRACT

A hybrid vehicle includes a power transmission unit configured to switch a power transmission path between an engine, a first MG, and a second MG. The control device is configured such that, during execution of regenerative braking using at least one of the first MG and the second MG while the engine is stopped, when a state amount indicating a state related to a battery has reached a determination threshold, the control device executes a standby operation in which the state of the power transmission unit is brought from a current state closer to a state that enables an engine brake operation in which the engine in a fuel-cut state is rotated using an external force to generate a loss.

11 Claims, 17 Drawing Sheets

(51) Int. Cl.
*B60K 6/26* (2007.10)
*B60K 6/28* (2007.10)
*B60W 20/20* (2016.01)
*B60W 10/08* (2006.01)
*B60W 10/10* (2012.01)
*B60K 6/365* (2007.10)
*B60K 6/387* (2007.10)
*B60K 6/442* (2007.10)
*B60K 6/445* (2007.10)
*B60K 6/543* (2007.10)
*B60W 10/115* (2012.01)
*B60W 30/18* (2012.01)

(52) U.S. Cl.
CPC ... *B60W 2510/244* (2013.01); *B60W 2520/10* (2013.01); *B60W 2540/10* (2013.01); *B60W 2540/12* (2013.01); *B60W 2710/021* (2013.01); *B60W 2710/0605* (2013.01); *B60W 2710/0616* (2013.01); *B60W 2710/083* (2013.01); *B60Y 2200/92* (2013.01); *Y02T 10/6221* (2013.01); *Y02T 10/6234* (2013.01); *Y02T 10/6239* (2013.01); *Y02T 10/6286* (2013.01); *Y02T 10/6295* (2013.01); *Y02T 10/7005* (2013.01); *Y02T 10/7077* (2013.01); *Y02T 10/92* (2013.01); *Y10S 903/906* (2013.01); *Y10S 903/911* (2013.01); *Y10S 903/914* (2013.01); *Y10S 903/919* (2013.01); *Y10S 903/93* (2013.01)

(56) References Cited

U.S. PATENT DOCUMENTS

| | | | |
|---|---|---|---|
| 2013/0131941 A1* | 5/2013 | Kitahata | B60K 6/38 701/58 |
| 2013/0297134 A1* | 11/2013 | Saito | B60L 7/18 701/22 |
| 2013/0311028 A1* | 11/2013 | Ohkuma | B60W 10/06 701/22 |
| 2013/0311061 A1* | 11/2013 | Ando | B60W 10/06 701/102 |
| 2014/0032027 A1* | 1/2014 | Aoki | B60K 6/445 701/22 |
| 2014/0131124 A1* | 5/2014 | Severinsky | B60H 1/004 180/65.245 |
| 2015/0021110 A1* | 1/2015 | Ono | B60K 6/365 180/65.235 |
| 2016/0137185 A1* | 5/2016 | Morisaki | B60L 7/10 701/22 |

FOREIGN PATENT DOCUMENTS

| | | |
|---|---|---|
| JP | 2010-018212 A | 1/2010 |
| JP | 2010-173420 A | 8/2010 |
| JP | 2012-183907 A | 9/2012 |
| WO | 2013/114594 A1 | 8/2013 |

\* cited by examiner

FIG.4

| | RUNNING STATE | | | | C1 | B1 | CS | MG1 | MG2 |
|---|---|---|---|---|---|---|---|---|---|
| E1 | EV RUNNING | FORWARD/BACKWARD | SINGLE MOTOR | WHEN DRIVEN | × | × | × | | M |
| E2 | | | | WHEN (CS) ENGINE BRAKE OPERATED | △ | △ | × | M | G |
| E3 | | | TWO MOTORS | Ne=0 | ○ | ○ | × | M | M |
| E4 | | | | Ne FREE — HIGH GEAR | × | ○ | ○ | M | M |
| E5 | | | | Ne FREE — LOW GEAR | ○ | × | ○ | M | M |
| H1 | HV RUNNING | SERIES/PARALLEL | FORWARD | CONTINUOUS — HIGH GEAR | × | ○ | × | G | M |
| H2 | | | | CONTINUOUS — LOW GEAR | ○ | × | × | G | M |
| H6 | | PARALLEL | | STEPPED — HIGH GEAR — SINGLE MOTOR | × | ○ | ○ | | M |
| H7 | | | | STEPPED — HIGH GEAR — TWO MOTORS | × | ○ | ○ | M | M |
| H8 | | | | STEPPED — LOW GEAR — SINGLE MOTOR | ○ | × | ○ | | M |
| H9 | | | | STEPPED — LOW GEAR — TWO MOTORS | ○ | × | ○ | M | M |
| H3 | | SERIES/PARALLEL | BACKWARD | LOW GEAR | ○ | × | × | G | M |
| H4 | | SERIES | FORWARD | (CD, WHEN ENGINE BRAKE OPERATED) | × | × | ○ | G | M |
| H5 | | | BACKWARD | | × | × | ○ | G | M |

○ : ENGAGED
△ : EITHER ONE IS ENGAGED WHEN ENGINE BRAKE IS USED IN COMBINATION
× : RELEASED
G : OPERATES MAINLY AS GENERATOR
M : OPERATES MAINLY AS MOTOR, BUT AS GENERATOR DURING REGENERATION (t=t5)

| RUNNING MODE | | ENGAGEMENT TABLE | | | CHARACTERISTICS |
|---|---|---|---|---|---|
| | | B3 | C3 | C4 | |
| EV | 1-MG | O | – | – | DRIVEN WITH MG2 (DECELERATION VIA PLANETARY GEAR) |
| | 2-MG | – | O | – | DRIVEN WITH MG1 AND MG2<br>ROTATION SPEEDS OF TWO MOTORS CAN BE SELECTED FOR HIGH TOTAL EFFICIENCY |
| HV | 1-MG | O | – | O | DRIVEN WITH MG2 (DECELERATION VIA PLANETARY GEAR)<br>SERIES HYBRID OPERATION WITH ENGINE ON |
| | 2-MG | – | O | O | DRIVEN WITH MG1, MG2 AND ENGINE<br>OUTPUT SPLIT OPERATION WITH ENGINE ON |

HYBRID VEHICLE

This nonprovisional application is based on Japanese Patent Application No. 2015-029437 filed on Feb. 18, 2015, with the Japan Patent Office, the entire contents of which are hereby incorporated by reference.

BACKGROUND OF THE INVENTION

Field of the Invention

This invention relates to a hybrid vehicle, and particularly to a hybrid vehicle including first and second rotating electric machines and an internal combustion engine.

Description of the Background Art

A hybrid vehicle is known that is configured to include, in addition to an engine, two rotating electric machines and a power split device, a transmission mechanism between the engine and the power split device.

The vehicle disclosed in WO2013/114594 adopts a series/parallel hybrid system. In the vehicle using the series/parallel hybrid system, motive power of the engine is transmitted to a first motor generator (first MG) to be used for generating electric power, while part of the motive power of the engine is transmitted to a driving wheel via the power split device.

A hybrid vehicle is also known that is configured to perform series running by generating electric power using the motive power of the engine, and driving the motors using the generated electric power (series hybrid system). With this series hybrid system, the motive power of the engine is not transmitted to the driving wheel.

The vehicle disclosed in the above-mentioned document has a configuration such that it cannot perform series running because, when the motive power of the engine is transmitted to the first motor generator (first MG), it is also transmitted to the driving wheel via the power split device.

With the series/parallel hybrid system, when the vehicle speed is low, for example, torque variations in the engine may cause rattling noise to be generated by a gear mechanism disposed in a drive device between the engine and the driving wheel. It is thus necessary to select an operating point of the engine to prevent generation of such rattling noise, and the engine is sometimes operated at an operating point not optimal in terms of fuel efficiency. Thus, there has been room for improvement in terms of fuel efficiency.

On the other hand, with the series system, the engine and the gear mechanism disposed in the drive device are completely decoupled from each other, without the need to take such rattling noise into much consideration. However, all the torque of the engine is converted to electric power once, and then converted back to a torque for the driving wheel by the motors. This makes the series system inferior to the series/parallel hybrid system in terms of fuel efficiency, within a range of speeds where the engine has good operating efficiency.

As described above, because the series/parallel hybrid system is superior to the series hybrid system in some ways, it would be desirable to have a configuration such that series running or series/parallel running can be selected depending on the conditions of the vehicle.

In order to realize such a hybrid vehicle capable of both series running and series/parallel running, a configuration may be provided that includes a clutch directly connecting the engine and the first motor generator. In a series running state where the engine and the first motor generator are directly connected, electric power resulting from regenerative braking generated by a second motor generator during braking is consumed by the causing first motor generator to continue cranking the engine that is not self-rotating. This state can also be regarded as one mode where an engine brake is being used. That is, because the engine is caused to idle, a friction brake need not be used for running on a long downhill, for example.

In particular, the engine brake may be used when charging of a power storage device is to be restricted, which restricts the use of a regenerative brake. If, however, the clutch connecting the engine and the first motor generator is engaged after reception of a deceleration request from a driver, the start of the engine brake would be delayed. In particular, at low temperatures where the clutch response becomes poor, the operation of the engine brake need to be started earlier.

SUMMARY OF THE INVENTION

An object of this invention is to provide a hybrid vehicle that allows the engine brake to be quickly operated when charging of the power storage device is to be restricted.

In summary, this invention provides a hybrid vehicle including a power storage device, an internal combustion engine, a first rotating electric machine, a second rotating electric machine, a power transmission unit configured to switch a power transmission path between three rotation shafts of the internal combustion engine, the first rotating electric machine, and the second rotating electric machine, and a control device that controls the internal combustion engine, the first rotating electric machine, the second rotating electric machine, and the power transmission unit. The control device is configured such that, during execution of regenerative braking using at least one of the first rotating electric machine and the second rotating electric machine while the internal combustion engine is stopped, when a state amount indicating a state related to the power storage device has exceeded a prescribed amount, the control device executes a standby operation in which a state of the power transmission unit is brought from a current state closer to a state where regenerative electric power is generated by a rotating force of a wheel using the second rotating electric machine, and the internal combustion engine in a fuel-cut state is rotated using the first rotating electric machine, so as to allow the regenerative electric power to be consumed by the first rotating electric machine. The prescribed amount is a preset value for determining that the state amount has become close to a state where charging of the power storage device is to be restricted.

As described above, the standby operation is executed to prepare for an engine brake operation, prior to the state amount reaching the state where charging of the power storage device is to be restricted. This allows the engine brake operation to be responsively performed when the state amount has reached the state where charging of the power storage device is to be restricted. Moreover, through this control, charging of the power storage device can be restricted while allowing a braking force to be continuously generated by the second rotating electric machine.

Preferably, the power transmission unit includes a transmission unit, a differential unit, and a clutch. The transmission unit has an input element to which motive power is input from the internal combustion engine, and an output element from which the motive power input to the input element is output, and is configured to switch between a non-neutral state where the motive power is transmitted between the input element and the output element and a neutral state where the motive power is not transmitted between the input element and the output element. The differential unit has a first rotation element connected to the first rotating electric machine, a second rotation element connected to the second rotating electric machine and the wheel, and a third rotation element connected to the output element, and is configured such that when a rotation speed of any two of the first to third rotation elements is set, a rotation speed of a remaining one rotation element is set. The clutch is configured to switch between an engaged state where the motive power is transmitted from the internal combustion engine to the first rotating electric machine and a released state where transmission of the motive power from the internal combustion engine to the first rotating electric machine is cut off. The control device brings the clutch closer to the engaged state from the released state as the standby operation.

When the configuration described above is adopted for the hybrid vehicle, engagement of the clutch connects the internal combustion engine and the first rotating electric machine. This allows the internal combustion engine to rotate with a torque output from the first rotating electric machine. Because the electric power is consumed by the first rotating electric machine at this time, charging of the power storage device is restricted.

Preferably, the state amount corresponds to charging electric power to the power storage device. If the standby operation is executed prior to the charging electric power reaching a restricted value thereof, the engine brake operation can be responsively performed when the charging electric power has reached the state where charging of the power storage device is to be restricted.

Preferably, the state amount corresponds to a state of charge (power storage amount or remaining capacity) of the power storage device. If the standby operation is executed prior to the state of charge of the power storage device reaching an upper limit value for the control of the state of charge, the engine brake operation can be responsively performed when the state of charge has reached the state where charging of the power storage device is to be restricted.

More preferably, when a user is requesting an engine brake to be operated (for example, when a shift range is a B range or an L range), the control device brings the clutch closer to the engaged state at an earlier stage than when the shift range is a D range. The D range indicates a normal range used in a normal state, the B range indicates a running range used when a powerful engine brake is required (brake range), and the L range indicates a running range where a high-speed side is more restricted than in the D range. When the shift range is the B or L range, it is assumed that the user desires that the engine brake be operated at an early stage. Through the control as described above, therefore, when the shift range is the B or L range, the engine brake operation can be performed more responsively than when the shift range is the D range.

More preferably, in a series of operations for engaging the clutch, the standby operation may be defined from the time when the state amount has reached a determination threshold, to a synchronizing operation in which a rotation difference between an input and an output of the clutch is adjusted to zero. The standby operation may further include an operation in which a stroke of the clutch is shortened. The standby operation may further advance, and include an operation in which the clutch is brought into a semi-engaged state.

More preferably, the power transmission unit is configured to be capable of switching between a first EV running mode and a second EV running mode to cause the vehicle to run. The first EV running mode is a mode where the vehicle is caused to run using only a torque output from the second rotating electric machine while the internal combustion engine is stopped. The second EV running mode is a mode where the vehicle is caused to run using a torque output from the first rotating electric machine and the torque output from the second rotating electric machine while the internal combustion engine is stopped. When the vehicle is running in the second EV running mode, the control device controls the power transmission unit to switch the running mode of the vehicle to the first EV running mode from the second EV running mode, as the standby operation.

In this way, when there are a plurality of EV running modes, the running mode is changed to an EV running mode that facilitates a transition to the engine brake operation, as the standby operation, when the state amount has become close to the state where charging of the power storage device is to be restricted. This allows the engine brake operation to be responsively performed when the state amount has reached the state where charging of the power storage device is to be restricted.

More preferably, the power transmission unit is configured to be capable of switching the running mode of the hybrid vehicle between a series mode and a series/parallel mode. The series mode is a mode where electric power is generated by the first rotating electric machine using a driving torque of the internal combustion engine, and the wheel is rotated using a driving torque of the second rotating electric machine, while the internal combustion engine and the first rotating electric machine are decoupled from the second rotating electric machine. The series/parallel mode is a mode where the wheel is rotated using the drive torque of the internal combustion engine, a drive torque of the first rotating electric machine, and the drive torque of the second rotating electric machine, while motive power is transmitted between the internal combustion engine, the first rotating electric machine, and the second rotating electric machine.

According to the present invention, the response of the operation of an engine brake is enhanced when the engine brake is required.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing each running mode, as well as control states of a clutch C1 and a brake B1 of a transmission unit 40 in each running mode.

FIG. 24 is a diagram for explaining relations between running modes and engagement elements in hybrid vehicle 601.

DESCRIPTION OF THE PREFERRED EMBODIMENTS

Figure 1:
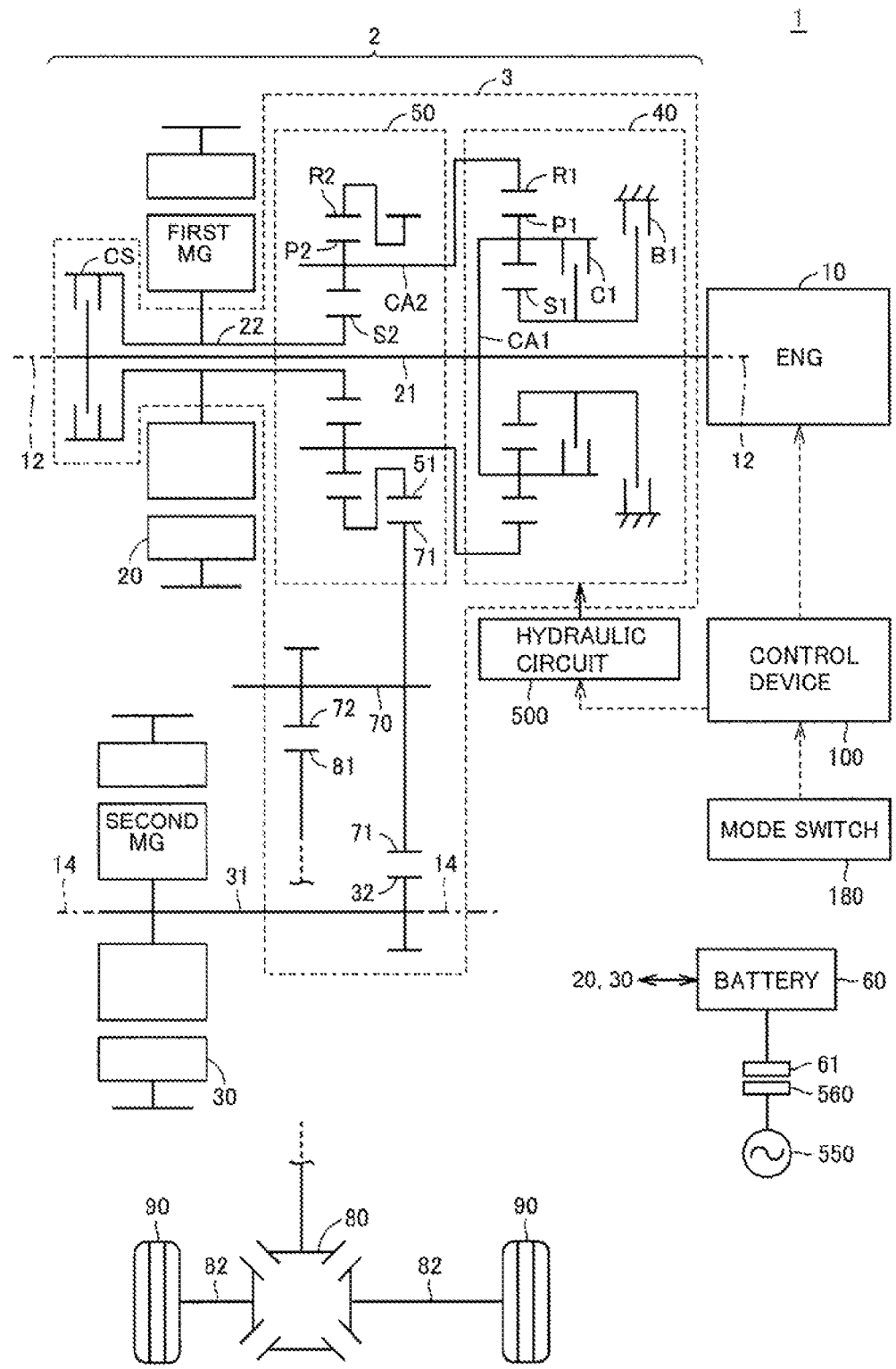
FIG. 1 is a diagram showing an overall configuration of a hybrid vehicle including a drive device according to an embodiment of this invention.

Embodiments of this invention will be hereinafter described referring to the drawings. In the following embodiments, the same or corresponding parts will be indicated by the same reference signs, and the description thereof will not be repeated.

[First Embodiment]

In the first embodiment, a basic configuration and basic operation of a hybrid vehicle 1 will be described first with FIGS. 1 to 13, and then control and operation during an engine brake operation will be described with FIGS. 14 to 21.

[Overall Configuration of Hybrid Vehicle]

FIG. 1 is a diagram showing an overall configuration of a hybrid vehicle including a drive device according to the embodiment of this invention.

Referring to FIG. 1, hybrid vehicle 1 includes an engine 10, a drive device 2, driving wheels 90, and a control device 100. Drive device 2 includes a first motor generator (hereinafter referred to as "first MG") 20, a second motor generator (hereinafter referred to as "second MG") 30, a power transmission unit 3, a differential gear 80, a hydraulic circuit 500, and a battery 60. Power transmission unit 3 includes a transmission unit 40, a differential unit 50, a clutch CS, an input shaft 21, and an output shaft (counter shaft) 70.

Hybrid vehicle 1 is a hybrid vehicle of an FF (Front engine Front drive) system that runs with the motive power of at least any of engine 10, first MG 20, and second MG 30.

Hybrid vehicles 1 is a plug-in hybrid vehicle in which battery 60 is chargeable through an external power supply 550. A user can charge battery 60 by connecting a charging connector 560 connected to external power supply 550 to an inlet 61 disposed on the vehicle. The plug-in hybrid vehicle can run in a CD (Charge Depletion) mode where electric power charged in battery 60 is mainly consumed, or in a CS (Charge Sustain) mode where fuel is mainly consumed to generate a driving force or electric power with the motive power of engine 10, so as to sustain the state of charge of battery 60 within a certain range. Generally, when battery 60 has been sufficiently charged through external power supply 550, the plug-in hybrid vehicle runs in the CD mode until the SOC of battery 60 decreases to a prescribed value, and runs in the CS mode after the SOC of battery 60 has decreased to the prescribed value.

Engine 10 is, for example, an internal combustion engine such as a gasoline engine or a diesel engine.

Each of first MG 20 and second MG 30 is, for example, a permanent magnet type synchronous motor having a rotor in which a permanent magnet is embedded. Drive device 2 is a multi-shaft type drive device in which first MG 20 is disposed on a first axis 12 coaxial with a crankshaft (output shaft) of engine 10, and second MG 30 is disposed on a second axis 14 different from first axis 12. First axis 12 and second axis 14 are parallel to each other.

Transmission unit 40, differential unit 50, and clutch CS are further arranged on first axis 12. Transmission unit 40, differential unit 50, first MG 20, and clutch CS are arranged in the order mentioned from the side near engine 10.

First MG 20 is disposed such that the motive power from engine 10 can be input thereto. More specifically, input shaft 21 of drive device 2 is connected to the crankshaft of engine 10. Input shaft 21 extends along first axis 12 in a direction away from engine 10. Input shaft 21 is connected to clutch CS at a tip extended from engine 10. Rotation shaft 22 having a cylindrical shape of first MG 20 extends along first axis 12. Input shaft 21 passes through the inside of rotation shaft 22 before being connected to clutch CS. Input shaft 21 is connected to rotation shaft 22 of first MG 20 via clutch CS.

Clutch CS is disposed on a power transmission path from engine 10 to first MG 20, Clutch CS is a hydraulic friction engagement element that can couple input shaft 21 and rotation shaft 22 of first MG 20. When clutch CS is brought into an engaged state, input shaft 21 and rotation shaft 22 are coupled to each other, which permits transmission of motive power from engine 10 to first MG 20. When clutch CS is brought into a released state, input shaft 21 and rotation shaft 22 are decoupled from each other, which cuts off the transmission of the motive power from engine 10 to first MG 20 via clutch CS.

Transmission unit 40 shifts the motive power from engine 10 for output to differential unit 50. Transmission unit 40 has a single pinion type planetary gear mechanism including a sun gear S1, a pinion gear P1, a ring gear R1, and a carrier CA1, and also has a clutch C1 and a brake B1.

Sun gear S1 is disposed such that its center of rotation is first axis 12. Ring gear R1 is disposed coaxially with sun gear S1 and radially outward of sun gear S1. Pinion gear P1 is disposed between sun gear S1 and ring gear R1, and meshes with sun gear S1 and ring gear R1. Pinion gear P1 is rotatably supported by carrier CA1. Carrier CA1 is connected to input shaft 21 and rotates integrally with input shaft 21. Pinion gear P1 is disposed to be capable of rotating (revolving) around first axis 12, and capable of rotating (revolving) around the center shaft of pinion gear P1.

As will be shown in each of FIGS. 5 to 11 described later, the rotation speed of sun gear S1, the rotation speed of carrier CA1 (that is, the rotation speed of engine 10), and the rotation speed of ring gear R1 are related to one another such that they are connected in a straight line in the nomographic chart (that is, when any two of the rotation speeds are set, the remaining rotation speed is also set).

In this embodiment, carrier CA1 is provided as an input element to which the motive power from engine 10 is input, and ring gear R1 is provided as an output element from which the motive power input to carrier CA1 is output. Through the planetary gear mechanism including sun gear S1, pinion gear P1, ring gear R1, and carrier CA1, the motive power input to carrier CA1 is shifted and output from ring gear R1.

Clutch C1 is a hydraulic friction engagement element that can couple sun gear S1 and carrier CA1. When clutch C1 is brought into an engaged state, sun gear S1 and carrier CA1 are coupled to each other and rotate integrally. When clutch C1 is brought into a released state, the integral rotation of sun gear S1 and carrier CA1 is removed.

Brake B1 is a hydraulic friction engagement element that can regulate (lock) the rotation of sun gear S1. When brake B1 is brought into an engaged state, sun gear S1 is fixed to a case body of the drive device, which regulates the rotation of sun gear S1. When brake B1 is brought into a released (disengaged) state, sun gear S1 is detached from the case body of the drive device, which permits the rotation of sun gear S1.

A gear ratio of transmission unit 40 (a ratio of the rotation speed of carrier CA1 as the input element to the rotation speed of ring gear R1 as the output element; more specifically, the rotation speed of carrier CA1/the rotation speed of ring gear R1) can be switched in accordance with the combination of engagement and release of clutch C1 and brake B1. When clutch C1 is engaged and brake B1 is released, a low gear stage Lo with a gear ratio of 1.0 (direct drive state) is created. When clutch C1 is released and brake B1 is engaged, a high gear stage Hi with a gear ratio of less than 1.0 (for example, 0.7, so-called overdrive state) is created. Note that when clutch C1 is engaged and brake B1 is engaged, the rotation of run gear S1 and carrier CA1 is regulated, which also regulates the rotation of ring gear R1.

Transmission unit 40 is configured to be capable of switching between a non-neutral state where the motive power is transmitted and a neutral state where the motive power is not transmitted. In this embodiment, the direct drive state and the overdrive state described above correspond to the non-neutral state. On the other hand, when clutch C1 and brake B1 are both released, carrier CA1 is capable of idling around first axis 12. This achieves the neutral state where the motive power transmitted from engine 10 to carrier CA1 is not transmitted to ring gear R1 from carrier CA1.

Differential unit 50 has a single pinion type planetary gear mechanism including a sun gear S2, a pinion gear P2, a ring gear R2, and a carrier CA2, and also has a counter drive gear 51.

Sun gear S2 is disposed such that its center of rotation is first axis 12. Ring gear R2 is disposed coaxially with sun gear S2 and radially outward of sun gear S2. Pinion gear P2 is disposed between sun gear S2 and ring gear R2, and meshes with sun gear S2 and ring gear R2. Pinion gear P2 is rotatably supported by carrier CA2. Carrier CA2 is connected to ring gear R1 of transmission unit 40, and rotates integrally with ring gear R1. Pinion gear P2 is disposed to be capable of rotating (revolution) around first axis 12, and capable of rotating (rotation) around the center shaft of pinion gear P2.

Sun gear S2 is coupled to rotation shaft 22 of first MG 20. Rotation shaft 22 of first MG 20 rotates integrally with sun gear S2. Counter drive gear 51 is connected to ring gear R2. Counter drive gear 51 is an output gear of differential unit 50, which rotates integrally with ring gear R2.

As will be shown in each of FIGS. 5 to 11 described later, the rotation speed of sun gear S2 (that is, the rotation speed of first MG 20), the rotation speed of carrier CA2, and the rotation speed of ring gear R2 are related to one another such that they are connected in a straight line in the nomographic chart (that is, when any two of the rotation speeds are set, a remaining rotation speed is also set). Thus, when the rotation speed of carrier CA2 is a prescribed value, rotation speed of ring gear R2 can be continuously switched by adjusting the rotation speed of first MG 20.

Output shaft (counter shaft) 70 extends in parallel with first axis 12 and second axis 14. Output shaft (counter shaft) 70 is arranged in parallel with rotation shaft 22 of first MG 20 and a rotation shaft 31 of second MG 30. Output shaft (counter shaft) 70 is provided with a driven gear 71 and a drive gear 72. Driven gear 71 meshes with counter drive gear 51 of differential unit 50. That is, the motive power of engine 10 and first MG 20 is transmitted to output shaft (counter shaft) 70 via counter drive gear 51 of differential unit 50.

Note that transmission unit 40 and differential unit 50 are connected in series on a power transmission path from engine 10 to output shaft (counter shaft) 70. Thus, the motive power from engine 10 is transmitted to output shaft (counter shaft) 70 after being shifted through transmission unit 40 and differential unit 50.

Driven gear 71 meshes with a reduction gear 32 connected to rotation shaft 31 of second MG 30. That is, the motive power of second MG 30 is transmitted to output shaft (counter shaft) 70 via reduction gear 32.

Drive gear 72 meshes with a differential ring gear 81 of differential gear 80. Differential gear 80 is connected to right and left driving wheels 90 via right and left driving shafts 82, respectively. That is, the rotation of output shaft (counter shaft) 70 is transmitted to the right and left drive shafts 82 via differential gear 80.

The configuration as described above including clutch CS allows hybrid vehicle 1 to operate in the series/parallel mode and in the series mode. In this context, how the motive power is transmitted from the engine in each of the modes will be described with the schematic diagram in FIG. 2.

Figure 2:
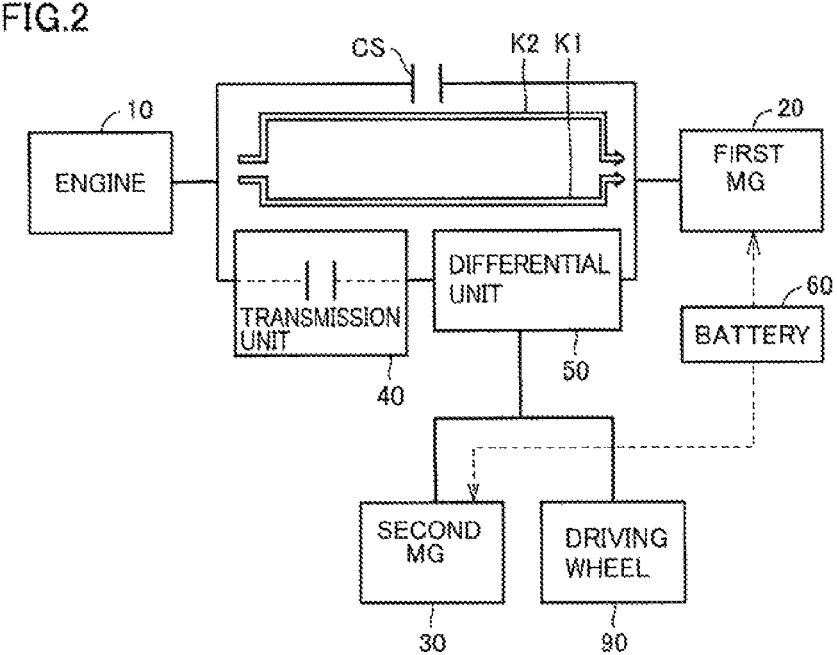
FIG. 2 is a block diagram showing a power transmission path between various components of the vehicle in FIG. 1 in simplified form.

FIG. 2 is a block diagram showing a power transmission path between various components of the vehicle in FIG. 1 in simplified form. Referring to FIG. 2, hybrid vehicle 1 includes engine 10, first MG 20, second MG 30, transmission unit 40, differential unit 50, battery 60, and clutch CS.

Second MG 30 is disposed to be capable of outputting the motive power to driving wheels 90. Transmission unit 40 has an input element to which the motive power from engine 10 is input, and an output element from which the motive power input to the input element is output. Transmission unit 40 is configured to be capable of switching between the non-neutral state where the motive power is transmitted between the input element and the output element and the neutral state where the motive power is not transmitted between the input element and the output element.

Battery 60 supplies electric power to first MG 20 and second MG 30 during power running, and stores electric power generated by first MG 20 and second MG 30 during regeneration.

Differential unit 50 has a first rotation element connected to first MG 20, a second rotation element connected to second MG 30 and driving wheels 90, and a third rotation element connected to the output element of transmission unit 40. Differential unit 50 is configured like a planetary gear mechanism, for example, such that the rotation speeds of any two of the first to third rotation elements are set, the rotation speed of a remaining one rotation element is also set.

Hybrid vehicle 1 is configured to be capable of transmitting the motive power from engine 10 to first MG 20 through at least any of two paths, K1, K2, for transmitting the motive power. Path K1 is a path for transmitting the motive power to first MG 20 from engine 10 by way of transmission unit 40 and differential unit 50. Path K2 is a path for transmitting the motive power to first MG 20 from engine 10 differently from path K1. Clutch CS is disposed along path K2, and is capable of switching between the engaged state where the motive power is transmitted from engine 10 to first MG 20 and the released state where the transmission of the motive power from engine 10 to first MG 20 is cut off.

In an HV running mode where the engine is operated, when transmission unit 40 is controlled to be in the non-neutral state with either clutch C1 or brake B1 being brought into an engaged state and the other into a released state, the motive power is transmitted to first MG 20 from engine 10 through path K1. When clutch CS is simultaneously brought into a released state to cut off path K2, the vehicle can be operated in the series/parallel mode.

On the other hand, in the HV running mode where the engine is operated, the vehicle can be operated in the series mode when the motive power is transmitted through path K2 with engine 10 and first MG 20 being directly connected to each other via clutch CS, and transmission unit 40 is controlled to be in the neutral state with clutch C1 and brake B1 both being brought into a released state to cut off path K1. At this time, the rotation element of differential unit 50 connected to transmission unit 40 is freely rotatable (free), such that the other two rotation elements are also rotatable without affecting each other. It is thus possible to independently perform the operation in which electric power is generated by rotating first MG 20 with the rotation of engine 10 and the operation in which the driving wheels are rotated by driving second MG 30 using the generated electric power or the electric power charged in battery 60.

Note that transmission unit 40 may not necessarily be capable of changing the gear ratio, and may alternatively be a simple clutch or the like as long as it is capable of cutting off the power transmission between engine 10 and differential unit 50 through path K1.

Figure 3:
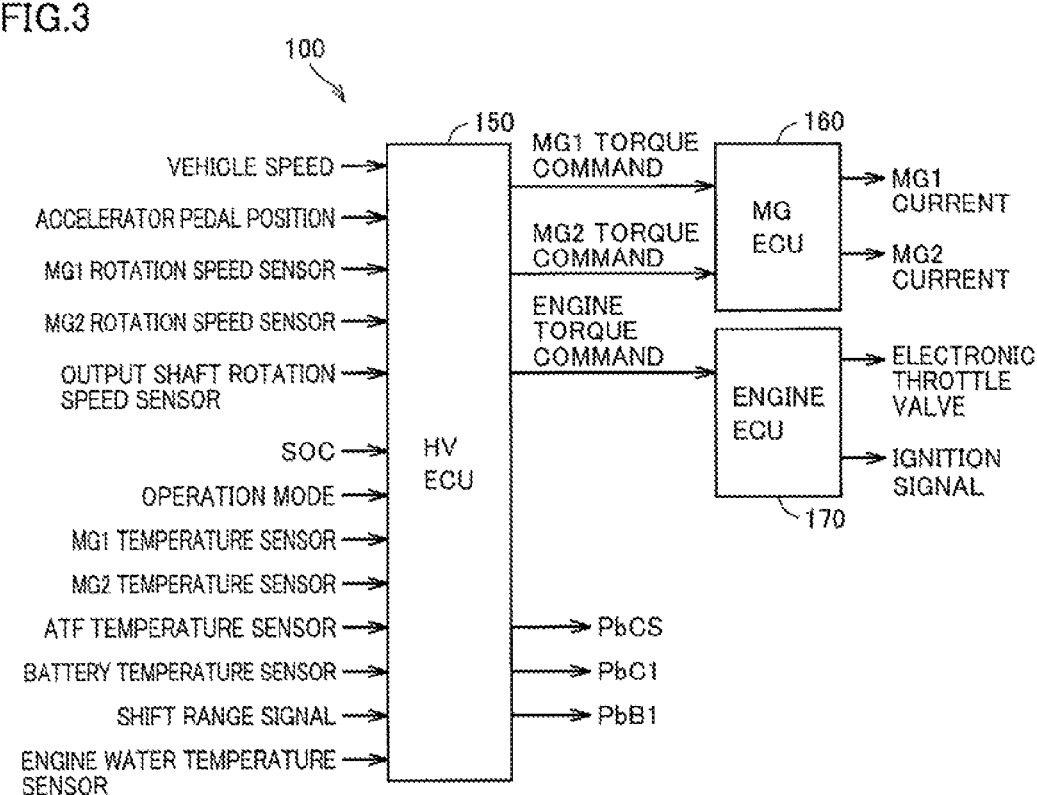
FIG. 3 is a block diagram showing the configuration of a control device 100 of the vehicle in FIG. 1.

FIG. 3 is a block diagram showing the configuration of control device 100 of the vehicle in FIG. 1. Referring to FIG. 3, control device 100 includes an HV ECU (Electric Control Unit) 150, an MG ECU 160, and an engine ECU 170. Each of HV ECU 150, MG ECU 160, and engine ECU 170 is an electronic control unit configured to include a computer. Note that the number of ECUs is not limited to three; alternatively, the ECUs may be integrated as a single ECU as a whole, or may be divided into two, or four or more.

MG ECU 160 controls first MG 20 and second MG 30. MG ECU 160, for example, controls an output torque of first MG 20 by adjusting a current value supplied to first MG 20, and controls an output torque of second MG 30 by adjusting a current value supplied to second MG 30.

Engine ECU 170 controls engine 10. Engine ECU 170, for example, performs control of the position of an electronic throttle valve of engine 10, ignition control of the engine by outputting an ignition signal, and injection control of fuel to engine 10. Engine ECU 170 controls an output torque of engine 10 by the electronic throttle valve position control, the injection control, the ignition control, and the like.

HV ECU 150 integrally controls the entire vehicle. HV ECU 150 is connected with a vehicle speed sensor, an accelerator pedal position sensor, an MG 1 rotation speed sensor, an MG 2 rotation speed sensor, an output shaft rotation speed sensor, a battery temperature sensor, an MG 1 temperature sensor, an MG 2 temperature sensor, an ATF (Automatic Transmission Fluid) temperature sensor, an engine water temperature sensor, and the like. From these sensors, HV ECU 150 obtains a vehicle speed, an accelerator pedal position, a rotation speed of first MG 20, a rotation speed of second MG 30, a rotation speed of the output shaft of the power transmission unit, a battery state SOC, and the like.

HV ECU 150 calculates, based on the obtained information, a required driving force, required power, a required torque, and the like for the vehicle. HV ECU 150 determines, based on the calculated required values, the output torque of first MG 20 (hereinafter also denoted as the "MG1 torque"), the output torque of second MG 30 (hereinafter also denoted as the "MG2 torque"), and the output torque of engine 10 (hereinafter also denoted as the "engine torque"). HV ECU 150 outputs a command value of the MG1 torque and a command value of the MG2 torque to MG ECU 160. HV ECU 150 also outputs a command value of the engine torque to engine ECU 170.

HV ECU 150 controls clutches C1, CS and brake B1 based on a running mode and the like described later. HV ECU 150 outputs, to hydraulic circuit 500 in FIG. 1, a command value of a hydraulic pressure supplied to clutches C1, CS and a command value of a hydraulic pressure supplied to brake B1.

Details of control modes of hybrid vehicle 1 will be described below with an operation engagement table and nomographic charts.

FIG. 4 is a diagram showing each running mode, as well as control states of clutch C1 and brake B1 of transmission unit 40 in each running mode.

Control device 100 causes hybrid vehicle 1 to run in a "motor running mode" (hereinafter referred to as the "EV running mode") or in a "hybrid running mode" (hereinafter referred to as the "HV running mode"). The EV running mode is a control mode where hybrid vehicle 1 is caused to run with the motive power of at least one of first MG 20 and second MG 30 while engine 10 is stopped. The HV running mode is a control mode where hybrid vehicle 1 is caused to run with the motive power of engine 10 and second MG 30. Each of the EV running mode and the HV running mode is subdivided into further control modes.

In FIG. 4, "C1", "B1", "CS", "MG1", and "MG2" indicate clutch C1, brake B1, clutch CS, first MG 20, and second MG 30, respectively. A round mark in the column of each of C1, B1 and CS indicates "engaged", a cross mark indicates "released", and a triangular mark indicates that either clutch C1 or brake B1 is engaged during engine braking. Moreover, "G" in the column of each of MG1 and MG2 indicates that the motor generator is operated mainly as a generator, and "M" indicates that the motor generator is operated mainly as a motor.

In the EV running mode, control device 100 selectively switches the control mode between a "single motor running mode" where hybrid vehicle 1 is caused to run with the motive power of second MG 30 alone and a "two motor running mode" where hybrid vehicle 1 is caused to run with the motive power of both first MG 20 and second MG 30, in accordance with the user's required torque and the like.

When the load on drive device 2 is low, the single motor running mode is used, and when the load is high, the control mode is transferred to the two motor running mode.

As shown in field E1 in FIG. 4, when hybrid vehicle 1 is driven (forward or backward) in the EV single motor running mode, control device 100 controls transmission unit 40 to be in the neutral state (where the motive power is not transmitted) by releasing clutch C1 and releasing brake B1. Here, control device 100 causes first MG 20 to operate mainly as a fixing means for fixing sun gear S2 to zero, and causes second MG 30 to operate mainly as a motor (see FIG. 6 described later). In order to cause first MG 20 to operate as the fixing means, control device 100 may control the current through first MG 20 by providing feedback of rotation speed such that the rotation speed of first MG 20 becomes zero. Alternatively, when the rotation speed of first MG 20 can be maintained at zero even at zero torque, cogging torque may be used without application of current. Note that when transmission unit 40 is controlled to be in the neutral state, engine 10 is not caused to rotate during braking. This reduces loss resulting from such rotation, and allows a large amount of regenerative electric power to be recovered.

On the other hand, as shown in field E3 in FIG. 4, when hybrid vehicle 1 is driven (forward or backward) in the EV two motor running mode, control device 100 regulates (locks) the rotation of ring gear R1 of transmission unit 40 by engaging clutch C1 and engaging brake B1. This also regulates (locks) the rotation of carrier CA2 of differential unit 50 coupled to ring gear R1 of transmission unit 40, which causes carrier CA2 of differential unit 50 to be held stationary (engine rotation speed Ne=0). Control device 100 then causes first MG 20 and second MG 30 to operate mainly as motors (see FIG. 7 described later).

In the HV running mode, control device 100 causes first MG 20 to operate mainly as a generator, and causes second MG 30 to operate mainly as a motor.

In the HV running mode, control device 100 sets the control mode to any of the series/parallel mode and the series mode.

In the series/parallel mode, part of the motive power of engine 10 is used to rotate driving wheels 90, and the remaining motive power is used as the motive power for first MG 20 to generate electric power. Second MG 30 causes driving wheels 90 to rotate using the electric power generated by first MG 20. In the series/parallel mode, control device 100 switches the gear ratio of transmission unit 40 in accordance with the vehicle speed.

When hybrid vehicle 1 is driven forward in a middle-low speed range, as shown in field H2 in FIG. 4, control device 100 creates a low gear stage Lo by engaging clutch C1 and releasing brake B1 (see the solid line in FIG. 8 described later). On the other hand, when hybrid vehicle 1 is driven forward in a high speed range, as shown in field H1 in FIG. 4, control device 100 creates a high gear stage Hi by releasing clutch C1 and engaging brake B1 (see the broken line in FIG. 8 described later). When both the high gear stage and the low gear stage are created, transmission unit 40 and differential unit 50 as a whole operate as a continuously variable transmission.

When hybrid vehicle 1 is driven backward, as shown in field H3 in FIG. 4, control device 100 engages clutch C1 and releases brake B1. Control device 100 then causes second MG 30 to rotate backward alone when the SOC of the battery is sufficient. On the other hand, when the SOC of the battery is insufficient, control device 100 causes engine 10 to operate, so as to cause first MG 20 to generate electric power and second MG 30 to rotate backward.

In the series mode, all the motive power of engine 10 is used as the motive power for first MG 20 to generate electric power. Second MG 30 drives driving wheels 90 using the electric power generated by first MG 20. In the series mode, when hybrid vehicle 1 is driven forward or backward, as shown in fields H4 and H5 in FIG. 4, control device 100 releases both clutch C1 and brake B1, and engages clutch CS (see FIG. 9 described later).

In the HV running mode, because engine 10 is operating, a mechanical oil pump is also operating. In the HV running mode, therefore, each of clutches C1 and CS or brake B1 is engaged mainly using the hydraulic pressure of the mechanical oil pump.

The state of each rotation element will be hereinafter described for each of the operation modes shown in FIG. 4, using nomographic charts.

Figure 5:
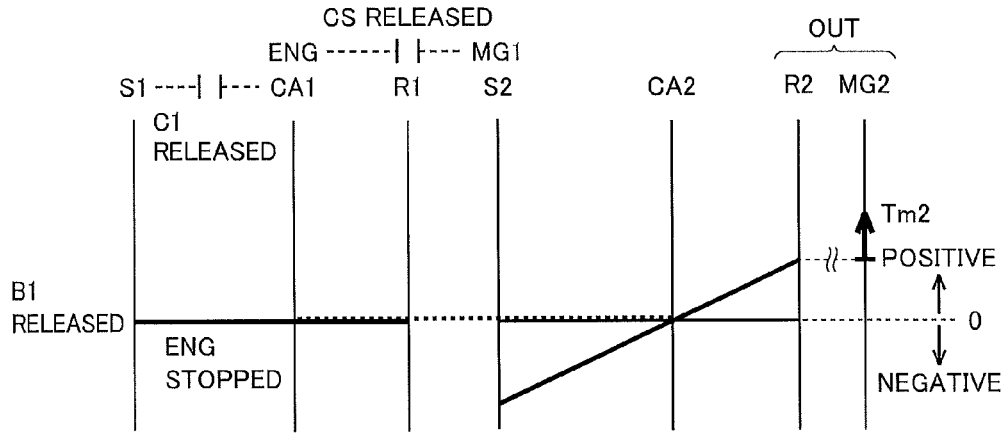
FIG. 5 is a nomographic chart showing an operating state in an EV single motor running mode (when MG 1 is asynchronous with the engine).
Figure 6:
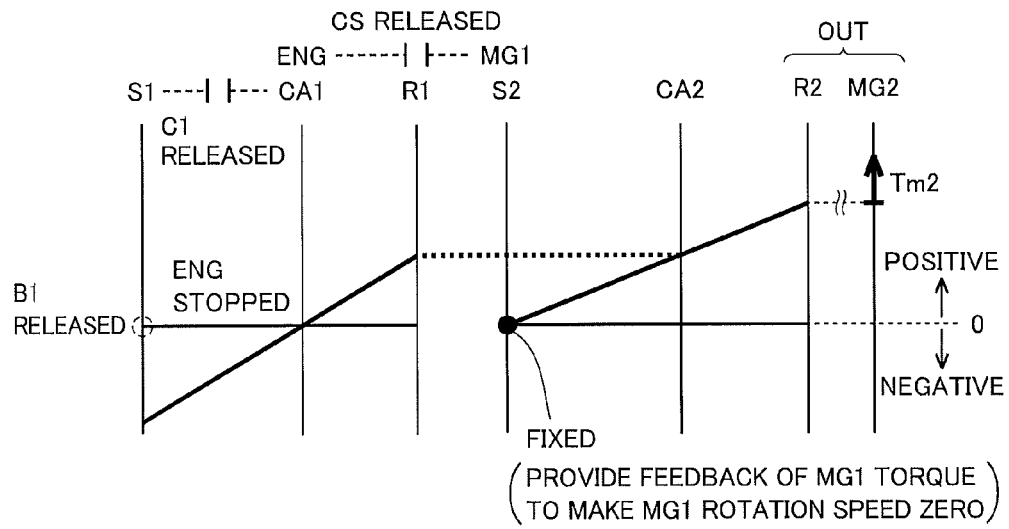
FIG. 6 is a nomographic chart showing an operating state in an EV single motor running mode (when MG 1 is synchronous with the engine).
Figure 7:
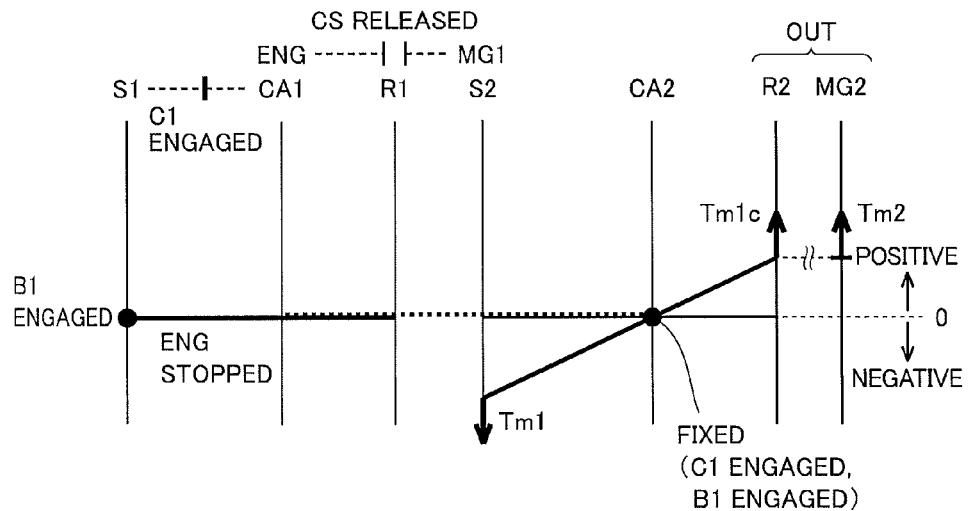
FIG. 7 is a nomographic chart in an EV two motor running mode.

FIG. 5 is a nomographic chart showing an operating state in the EV single motor running mode (when MG 1 is asynchronous with the engine). FIG. 6 is a nomographic chart showing an operating state in the EV single motor running mode (when MG 1 is synchronous with the engine). FIG. 7 is a nomographic chart in the EV two motor running mode. FIG. 8 is a nomographic chart in the HV running (series/parallel) mode. FIG. 9 is a nomographic chart in the HV running (series) mode.

In each of FIGS. 5 to 9, "S1", "CA1", and "R1" indicate sun gear S1, carrier CA1, and ring gear R1, respectively, of transmission unit 40, and "S2", "CA2", and "R2" indicate sun gear S2, carrier CA2, and ring gear R2, respectively, of differential unit 50.

A control state in the EV single motor running mode (FIG. 5: E1) will be described with FIGS. 5 and 6. In the EV single motor running mode, control device 100 releases clutch C1, brake B1, and clutch CS of transmission unit 40, and causes engine 10 to stop and causes second MG 30 to operate mainly as a motor. In the EV single motor running mode, therefore, hybrid vehicle 1 runs with the torque of second MG 30 (hereinafter referred to as "MG2 torque Tm2").

Because engine 10 is stopped, the rotation speed is zero. Here, the two states shown in FIGS. 5 and 6 can be attained.

In the state shown in FIG. 5, because all of the rotation elements of transmission unit 40 are at zero, there is only a small mechanical energy loss, if any, in transmission unit 40.

On the other hand, because the rotation speed of first MG 20 is negative, a mechanical energy loss results from the rotation of the rotor of second MG 20. Moreover, at this time, because a rotation difference is occurring between the two rotation elements of clutch CS, engagement of clutch CS causes a shock.

On the other hand, in the state shown in FIG. 6, control device 100 performs feedback control of the torque of first MG 20 (hereinafter referred to as the "MG1 torque Tm1") such that the rotation speed of sun gear S2 becomes zero. Thus, sun gear S2 does not rotate. However, because clutch C1 and brake B1 of transmission unit 40 are released, the rotation of carrier CA2 of differential unit 50 is not regulated. Thus, ring gear R2 and carrier CA2 of differential unit 50, as well as ring gear R1 of transmission unit 40 are caused to move in conjunction with the rotation of second MG 30, and rotate (idle) in the same direction as the direction of rotation of second MG 30.

On the other hand, carrier CA1 of transmission unit 40 is held stationary because engine 10 is stopped. Sun gear S1 of transmission unit 40 is caused to move in conjunction with the rotation of ring gear R1, and rotate (idle) in the opposite direction to the direction of rotation of ring gear R1.

In this state, because neither of the two engagement elements of clutch CS is rotating, there is only a low shock, if any, when clutch CS is engaged.

Next, referring to FIG. 7, a control state in the EV two motor running mode (FIG. 4: E3) will be described. In the EV two motor running mode, control device 100 engages clutch C1 and brake B1, releases clutch CS, and causes engine 10 to stop. Thus, the rotation speed of each of sun gear S1, carrier CA1, and ring gear R1 of transmission unit 40 is regulated to be zero.

Because the rotation of ring gear R1 of transmission unit 40 is regulated, the rotation of carrier CA2 of differential unit 50 is also regulated (locked). In this state, control device 100 causes first MG 20 and second MG 30 to operate mainly as motors. Specifically, second MG 30 is positively rotated using MG2 torque Tm2 as a positive torque, and first MG 20 is negatively rotated using MG1 torque Tm1 as a negative torque.

With clutch C1 being engaged and the rotation of carrier CA2 being regulated, MG1 torque Tm1 is transmitted to ring gear R2 with carrier CA2 as a support. MG1 torque Tm1 that is transmitted to ring gear R2 (hereinafter referred to as "MG1 transmitted torque Tm1c") acts in the positive direction, and is transmitted to counter shaft 70. In the EV two motor running mode, therefore, hybrid vehicle 1 runs with MG1 transmitted torque Tm1c and MG2 torque Tm2. Control device 100 adjusts a sharing ratio of MG1 torque Tm1 to MG2 torque Tm2 such that a total of MG1 transmitted torque Tm1c and MG2 torque Tm2 meets the user's required torque.

Figure 8:
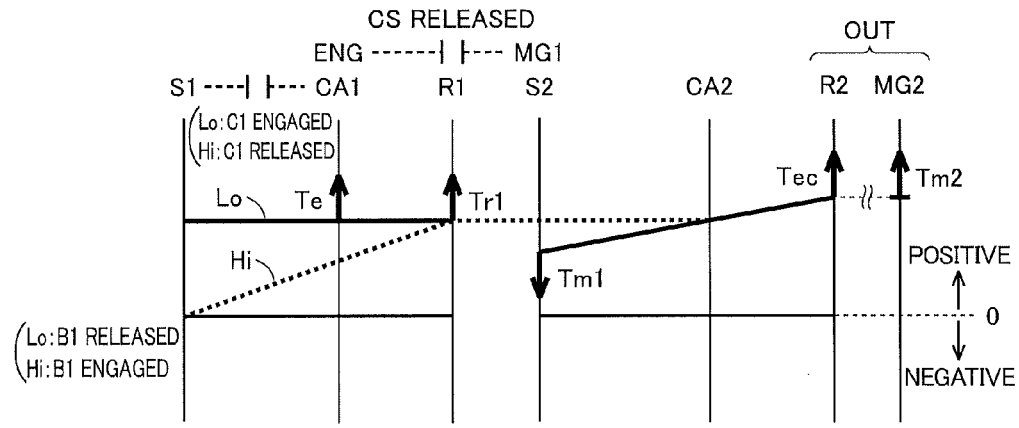
FIG. 8 is a nomographic chart in an HV running (series/parallel) mode.
Figure 9:
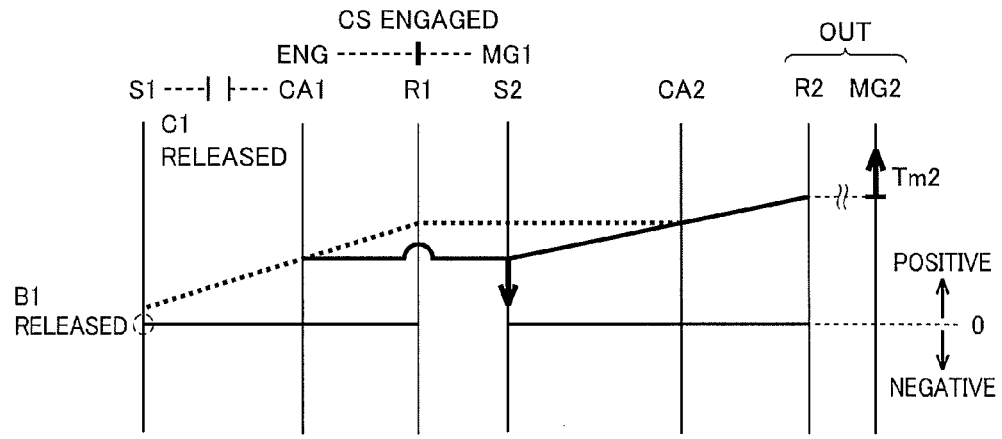
FIG. 9 is a nomographic chart in an HV running (series) mode.

Referring to FIG. 8, control states in the HV running (series/parallel) mode (FIG. 4: H1, H2) will be described. Note that FIG. 8 illustrates a case where hybrid vehicle 1 is running forward at low gear stage Lo (H2 in FIG. 4: see the solid collinear line shown in the nomographic chart of S1, CA1, and R1 in FIG. 8) and a case where hybrid vehicle 1 is running forward at high gear stage Hi (H1 in FIG. 4: see the broken collinear line shown in the nomographic chart of S1, CA1, and R1 in FIG. 8). Note that for convenience of description, the rotation speed of ring gear R1 is assumed to be the same both in the cases where hybrid vehicle 1 is running forward at low gear stage Lo and running forward at high gear stage Hi.

When in the HV running (series/parallel) mode, and when low gear stage Lo is created, control device 100 engages clutch C1, and releases brake B1 and clutch CS. Thus, the rotation elements (sun gear S1, carrier CA1, and ring gear R1) rotate integrally. This causes ring gear R1 of transmission unit 40 to rotate at the same speed as that of carrier CA1, and the rotation of engine 10 is transmitted at the same rotation speed to carrier CA2 of differential unit 50 from ring gear R1. That is, the torque of engine 10 that has been input to carrier CA1 of transmission unit 40 (hereinafter referred to as "engine torque Te") is transmitted to carrier CA2 of differential unit 50 from ring gear R1 of transmission unit 40. Note that the torque that is output from ring gear R1 when low gear stage Lo is created (hereinafter referred to as "transmission unit output torque Tr1") is the same in magnitude as engine torque Te (Te=Tr1).

The rotation speed of engine 10 transmitted to carrier CA2 of differential unit 50 is continuously shifted based on the rotation speed of sun gear S2 (rotation speed of first MG 20), and then transmitted to ring gear R2 of differential unit 50. At this time, control device 100 basically causes first MG 20 to operate as a generator, and causes MG1 torque Tm1 to act in the negative direction. Thus, MG1 torque Tm1 has a reaction force for transmitting engine torque Te that has been input to carrier CA2 to ring gear R2.

Engine torque Te transmitted to ring gear R2 (hereinafter referred to as "engine transmitted torque Tec") is transmitted to counter shaft 70 from counter drive gear 51, and acts as a driving force for hybrid vehicle 1.

Moreover, in the HV running (series/parallel) mode, control device 100 causes second MG 30 to operate mainly as a motor. MG2 torque Tm2 is transmitted to counter shaft 70 from reduction gear 32, and acts as a driving force for hybrid vehicle 1. That is, in the HV running (series/parallel) mode, hybrid vehicle 1 runs with engine transmitted torque Tec and MG2 torque Tm2.

On the other hand, when in the HV running (series/parallel) mode, and when high gear stage Hi is created, control device 100 engages brake B1, and releases clutch C1 and clutch CS. With brake B1 being engaged, the rotation of sun gear S1 is regulated. Thus, the rotation of engine 10 that has been input to carrier CA1 of transmission unit 40 is increased in speed, and then transmitted to carrier CA2 of differential unit 50 from ring gear R1 of transmission unit 40. Hence, when high gear stage Hi is created, transmission unit output torque Tr1 is smaller than engine torque Te (Te>Tr1).

Referring to FIG. 9, a control state in the HV running (series) mode (FIG. 4: H4) will be described. In the HV running (series) mode, control device 100 releases clutch C1 and brake B1, and engages clutch CS. Thus, with clutch CS being engaged, sun gear S2 of differential unit 50 rotates at the same rotation speed as that of carrier CA1 of transmission unit 40, and the rotation of engine 10 is transmitted at the same rotation speed to first MG 20 from clutch CS. This allows electric power to be generated by first MG 20 with engine 10 as a motive power source.

On the other hand, with both clutch C1 and brake B1 being released, the rotation of sun gear S1 and ring gear R1 of transmission unit 40 and the rotation of carrier CA2 of differential unit 50 are not regulated. That is, because transmission unit 40 is in the neutral state, and the rotation of carrier CA2 of differential unit 50 is not regulated, the motive power of first MG 20 and engine 10 is not transmitted to counter shaft 70. Thus, MG2 torque Tm2 of second MG 30 is transmitted to counter shaft 70. In the HV running (series) mode, therefore, with electric power being generated by first MG 20 using engine 10 as the motive power source, hybrid vehicle 1 runs with MG2 torque Tm2 using all or part of the generated electric power.

Because the series mode is now implementable, when the vehicle speed is low, or when the vehicle is in a state with low background noise, the operating point of the engine can be selected without concern for the generation of rattling noise by the gear mechanism due to engine torque variations, for which care was required in the series/parallel mode. This increases vehicle states where quietness and improved fuel efficiency of the vehicle can both be achieved.

In the context of the control modes described above, it has been described that in the HV running mode, the vehicle can be operated in the series mode by controlling transmission unit 40 to be in the neutral state, with engine 10 and first MG 20 being directly connected via clutch CS, and clutch C1 and brake B1 both being brought into a released state.

The following describes that the provision of clutch CS allows the vehicle to also operate in other different operation modes.

Referring back to FIG. 4, fields E4 and E5 in the EV running mode and fields H6 to H9 in the HV running mode will be described.

First, fields E4 and E5 in the EV running mode will be described. Although these additional modes also correspond to the two motor running mode as with field E3, they differ in that the vehicle can be operated at a point where an engine rotation speed Ne is not zero (denoted as "Ne FREE" in FIG. 4).

Figure 10:
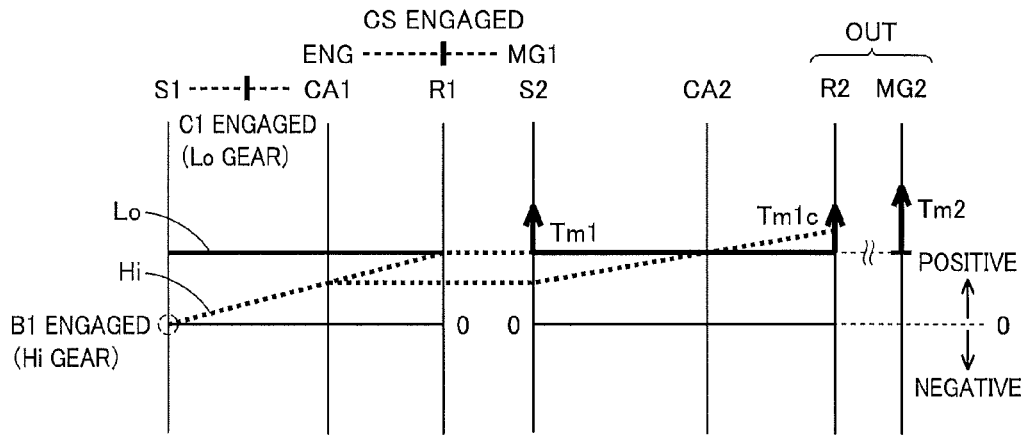
FIG. 10 is a nomographic chart for explaining the operation in each of fields E4 and E5 in FIG. 4.

FIG. 10 is a nomographic chart for explaining the operation in each of fields E4 and E5 in FIG. 4. Referring to FIG. 10, control states in the two motor running mode of EV running will be described. Note that FIG. 10 illustrates a case where the vehicle is running forward at low gear stage Lo (see the solid collinear line shown in FIG. 10) and a case where the vehicle is running forward at high gear stage Hi (see the broken collinear line shown in FIG. 10). Note that for convenience of description, the rotation speed of ring gear R1 is assumed to be the same both in the cases where the vehicle is running forward at low gear stage Lo and running forward at high gear stage Hi.

When low gear stage Lo is created in the EV running (two motor) mode (field E5 in FIG. 4), control device 100 engages clutch C1 and clutch CS, and releases brake B1. Thus, the rotation elements of transmission unit 40 (sun gear S1, carrier CA1, and ring gear R1) rotate integrally. Moreover, with clutch CS being engaged, carrier CA1 of transmission unit 40 and sun gear S2 of differential unit 50 rotate integrally. This causes all of the rotation elements of transmission unit 40 and differential unit 50 to rotate integrally at the same rotation speed. Therefore, along with MG2 torque Tm2 generated by second MG 30, MG1 torque Tm1 is generated by first MG 20 in the direction of positive rotation, thereby allowing hybrid vehicle 1 to run using both the motors. Here, because engine 10 is not self-rotating during EV running, engine 10 is in a driven state where it is rotated by the torques of first MG 20 and second MG 30. Preferably, therefore, the timing of opening and closing of valves is manipulated to reduce the resistance during the rotation of the engine.

First MG1 transmitted torque Tm1c that is transmitted to ring gear R2 is transmitted to counter shaft 70 from counter drive gear 51, and acts as a driving force for hybrid vehicle 1. Simultaneously, MG2 torque Tm2 is transmitted to counter shaft 70 from reduction gear 32, and acts as a driving force for hybrid vehicle 1. That is, when low gear stage Lo is created in the two motor running mode of EV running, hybrid vehicle 1 runs with MG1 torque Tm1 transmitted to ring gear R2 and MG2 torque Tm2.

On the other hand, when high gear stage Hi is created in the two motor running mode of EV running (FIG. 4: field E4), control device 100 engages brake B1 and clutch CS, and releases clutch C1. With brake B1 being engaged, the rotation of sun gear S1 is regulated.

Moreover, with clutch CS being engaged, carrier CA1 of transmission unit 40 and sun gear S2 of differential unit 50 rotate integrally. Thus, the rotation speed of sun gear S2 is the same as the rotation speed of engine 10.

Figure 11:
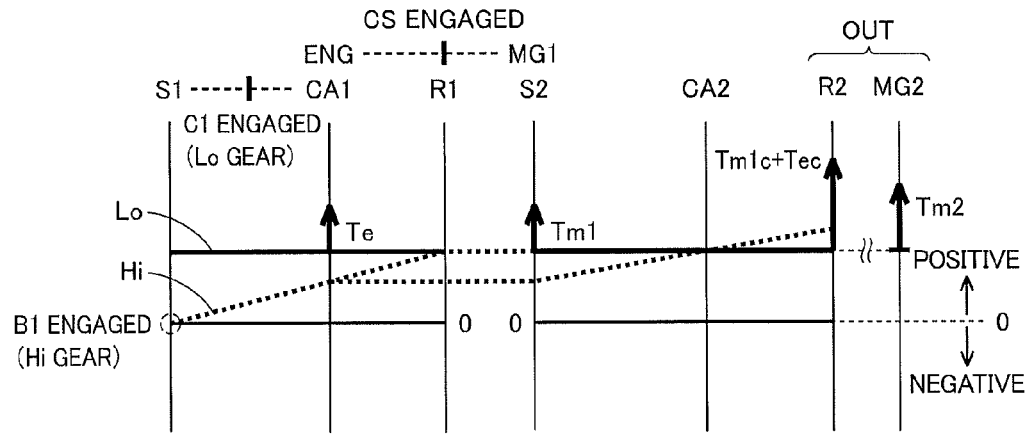
FIG. 11 is a nomographic chart for explaining the operation in each of fields E7 and E9 in FIG. 4.

FIG. 11 is a nomographic chart for explaining the operation in each of fields E7 and E9 in FIG. 4. Referring to FIG. 11, control states in the two motor running mode of HV running (parallel: stepped) will be described. Note that FIG. 11 illustrates a case where the vehicle is running forward at the low gear stage Lo (see the solid collinear line shown in FIG. 11) and a case where the vehicle is running forward at the high gear stage Hi (see the broken collinear line shown in FIG. 11).

As is seen from a comparison between FIGS. 10 and 11, because engine 10 self-rotates in the two motor running mode of HV running (parallel: stepped), engine torque Te is applied to carrier CA1 in FIG. 11. Thus, engine torque Tec is also added to ring gear R2. Since the nomographic chart shown in FIG. 11 is otherwise the same as that in FIG. 10, the description will not be repeated.

In the two motor running mode of HV running (parallel: stepped), all of engine torque Te, MG1 torque Tm1, and MG2 torque Tm2 can be used as the rotation torque in the forward direction for the driving wheels, which is particularly effective when a great torque is required for the driving wheels.

Note that the control states in the single motor running mode of HV running (parallel: stepped) correspond to the case where Tm1=0 in FIG. 11. Moreover, in the HV running mode (parallel: stepped), the vehicle can also run using the engine torque alone, with Tm1=0 and Tm2=0, in FIG. 11.

[Condition Under which Each Operation Mode is Used]

Figure 12:
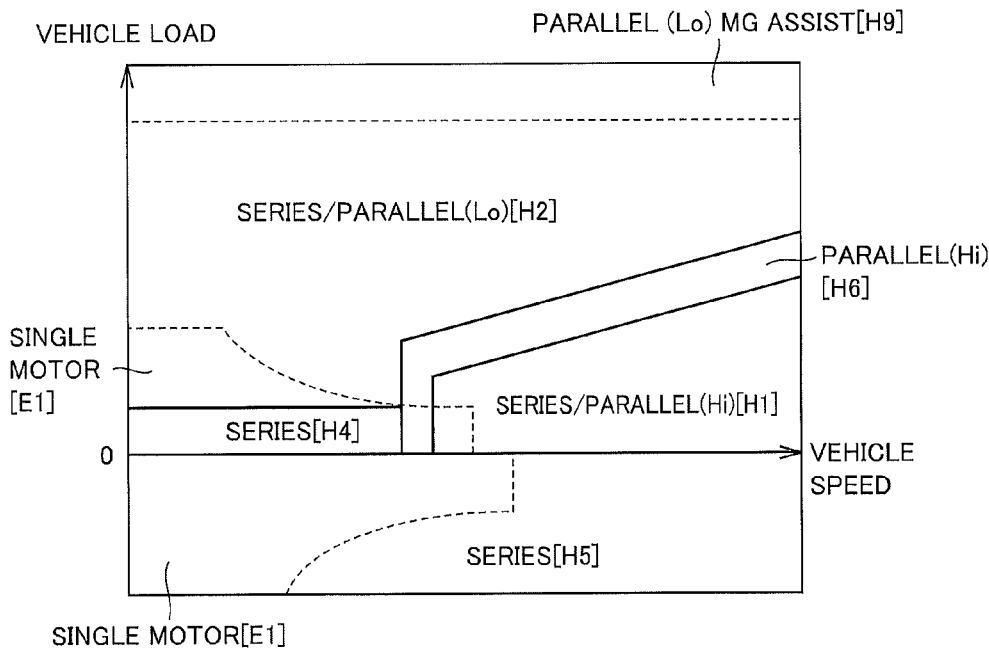
FIG. 12 is a mode determination map for determining a running mode when the hybrid vehicle runs mainly with fuel as an energy source.

FIG. 12 is a mode determination map for determining a running mode when the hybrid vehicle runs mainly with fuel as an energy source. This mode determination map is used when the hybrid vehicle runs in a normal state, or when a plug-in hybrid vehicle runs in the CS mode where the power storage state of the battery is sustained. FIG. 12 shows a map of which borderlines are indicated by the broken lines and a map of which borderlines are indicated by the solid lines, in a layered manner. The map of which borderlines are indicated by the broken lines are used in a normal state when input/output power to/from battery 60 is not restricted. On the other hand, the map of which borderlines are indicated by the solid lines are used when the input/output power to/from battery 60 is restricted in accordance with various conditions such as the SOC and temperature.

A range where the vehicle load is positive in the map of which borderlines are indicated by the broken lines will be described first. The EV single motor running mode is used within a range where the vehicle load is small at a vehicle speed near zero. Here, single motor running is used rather than two motor running, in order to allow the engine to be immediately started when the accelerator pedal is suddenly depressed. Then, when the vehicle speed becomes higher, or the vehicle load increases, the HV series/parallel mode (Lo gear) is used. When the vehicle load further increases, and the torque becomes insufficient with the HV series/parallel mode, all the engine torque is output to the driving wheels in the parallel mode (Lo gear), and motor assist that also uses the MG1 torque or MG2 torque is executed. Note that this mode may be used at the time of a power-on downshift.

A range where the vehicle load is negative in the map of which borderlines are indicated by the broken lines will be described next. The EV single motor running mode is used within a range where the vehicle load is small at a vehicle speed near zero. The HV series mode is used when the vehicle speed increases. Here, the range of the EV single motor running mode when the vehicle speed is negative is wider than that when the vehicle speed is positive. This is because the engine is started in the series mode, and thus, there is no need to allow for a reaction torque to reduce shock at the start of the engine in the EV single motor running mode.

A range where the vehicle load is positive in the map of which borderlines are indicated by the solid lines will be described next. When the vehicle load is positive, and the vehicle speed is low, the HV series mode is executed. The HV series mode is an operation mode effective for preventing noise caused by rattling between second MG 30 and the differential gear (so-called rattling noise).

As the vehicle speed increases, the operation mode transitions, from the series mode, to the parallel (Hi gear) mode without the use of the motor assist and the HV series/parallel (Hi gear) mode, in this order. The parallel (Hi gear) mode, which has a fixed gear ratio, is used in a relatively narrow band-like range because engine 10 tends to be operated outside an operating point having minimum fuel consumption.

The operation mode then transitions from the series mode to the series/parallel (Lo) mode as the vehicle load increases. The series/parallel (Lo) mode is an operation mode effective in a range where the driving force is given priority.

A range where the vehicle load is negative in the map of which borderlines are indicated by the solid lines will be described next. When the vehicle load is negative, the series mode is used regardless of the vehicle speed. In the series mode, the engine rotation speed can be controlled as desired at the same vehicle speed. Therefore, an engine braking torque in accordance with the driver's request can be generated. Because first MG 20 is rotated against the engine braking torque, first MG 20 performs a power running operation. This allows first MG 20 to consume regenerative electric power generated by second MG 30 during regenerative braking, which allows regenerative braking to be performed by second MG 30 even if battery 60 cannot receive the regenerative electric power. Moreover, because the rotation speed of first MG 20 and the engine rotation speed are the same, compared to the other modes, the series mode is unlikely to subject to a restriction on the engine rotation speed due to a rotation speed upper limit of first MG20. Thus, the absolute value of the engine braking torque can also be increased.

Figure 13:
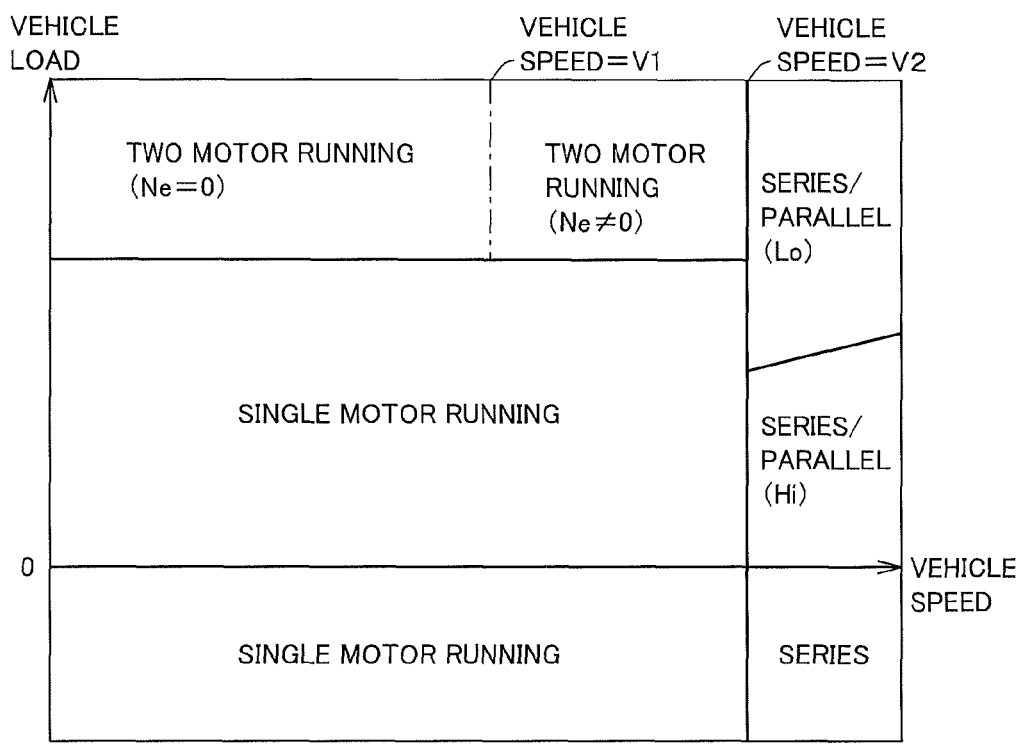
FIG. 13 is a mode determination map for determining a running mode when the hybrid vehicle runs mainly with electric power charged in a battery as an energy source.

FIG. 13 is a mode determination map for determining a running mode when the hybrid vehicle runs mainly with electric power charged in the battery as an energy source. This mode determination map is used when the hybrid vehicle performs EV running, or when a plug-in hybrid vehicle runs in the CD mode where the power storage state of the battery is consumed.

Referring to FIG. 13, the EV running mode of single motor running is used in positive and negative low-load ranges. In the CD mode, a relatively wide range can be allotted to the EV running mode of single motor running, because starting of engine 10 may not be basically contemplated and thus, a reaction force compensation torque accompanied by starting of engine 10 is not required.

In a high-load range, the two motor running mode is selected because the torque is insufficient with the single motor running That is, the EV running mode of single motor running is selected in the range where the vehicle speed is lower than a prescribed value and the load is small, and the EV mode of two motor running is selected when the load is greater than a prescribed value.

When the vehicle speed exceeds prescribed value V1 in the two motor running mode, there is an upper limit for the rotation speed of first MG 20 or the pinion gear. Therefore, the vehicle state changes from the two motor running where engine rotation speed Ne is zero (FIG. 7) to the two motor running where Ne is not zero (FIG. 10).

When the vehicle speed exceeds V2, energy efficiency during running with the electric power of the battery tends to decrease, and thus, an HV running mode of any of the series/parallel (Lo) mode, the series/parallel (Hi) mode, and the series mode is selected. In FIG. 13, in a range where the vehicle speed is higher than V2, the series mode is selected when the vehicle load is negative, and when the vehicle load is positive, the series/parallel (Hi) mode is selected at lower load, and the series/parallel (Lo) mode is selected at higher load.

[Exemplary Engine Brake Operation During Restriction of Battery Charging]

A hybrid vehicle basically performs regenerative braking with motor generators during deceleration to convert part of the kinetic energy of the vehicle into electrical energy for recovery into a battery. Regenerative braking, however, cannot be performed when charging of the battery is restricted, for example, when the power storage amount of the battery has reached an upper limit value for control, or when charging electric power is restricted due to a low battery temperature.

During running in the CS (Charge Sustain) mode and the EV single motor running mode, when an engine brake is required to brake hybrid vehicle 1, control device 100 engages either clutch C1 or brake B1, as shown in field E2 in FIG. 4. Regenerative electric power cannot be charged if, for example, the SOC of battery 60 is nearly a fully charged state. In this case, the vehicle may be put in an engine brake state.

By engaging either clutch C1 or brake B1, the engine brake state is attained where the rotation of driving wheels 90 is transmitted to engine 10 to rotate engine 10. At this time, control device 100 causes first MG 20 to operate mainly as a motor, and causes second MG 30 to operate mainly as a generator.

On the other hand, in the CD (Charge Depletion) mode, as shown in H4 in FIG. 4, the operation mode is set to the series mode where regenerative electric power generated by second MG 30 during regenerative braking is consumed by first MG 20. Thus, even if battery 60 cannot receive the regenerative electric power, regenerative braking can be performed by second MG 30.

Figure 14:
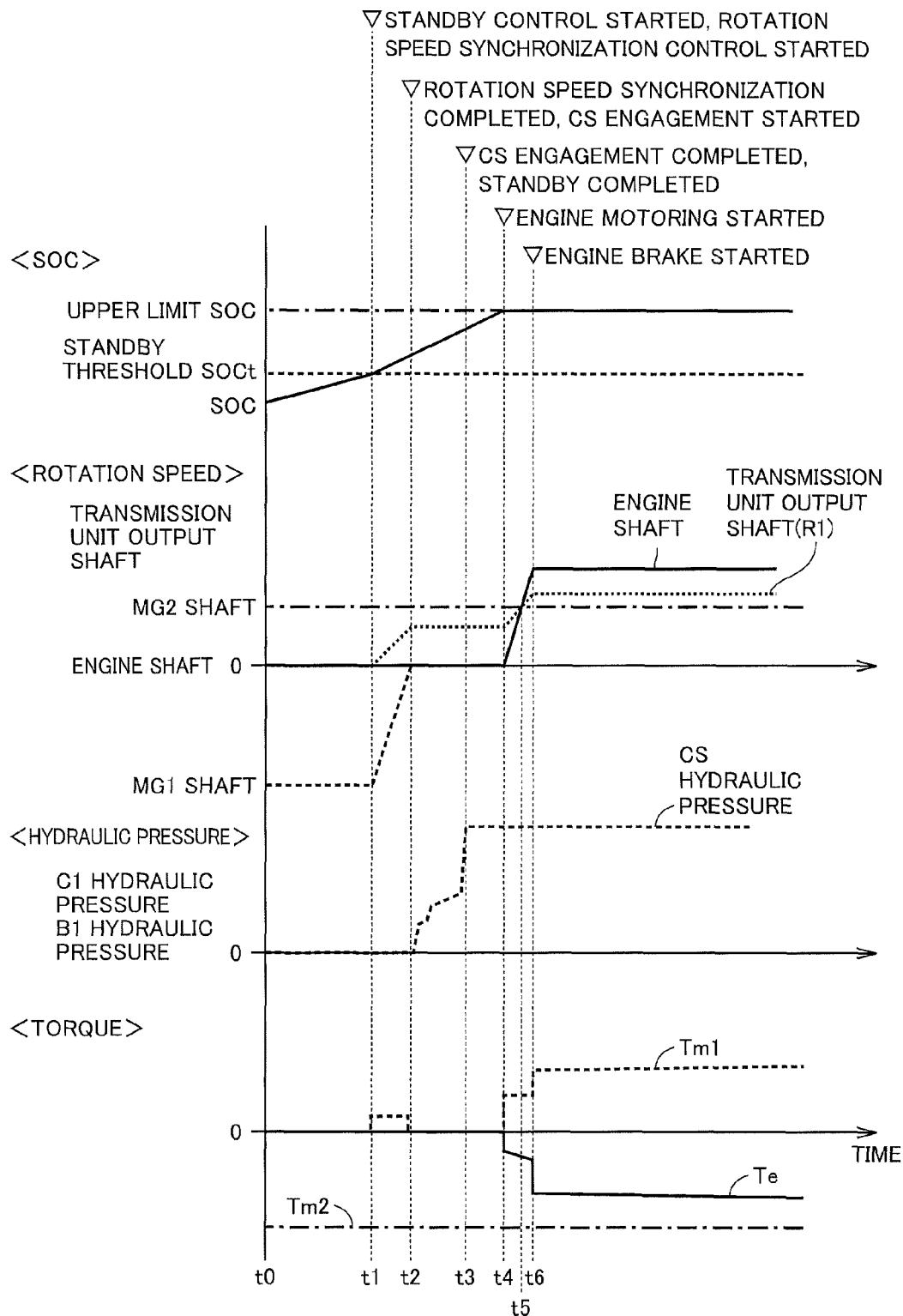
FIG. 14 is a timing chart for explaining how the SOC increases, and then an engine brake is operated while a plug-in hybrid vehicle is running with regenerative braking in the CD mode.

FIG. 14 is a timing chart for explaining how the SOC increases, and then an engine brake is operated while a plug-in hybrid car is running with regenerative braking in the CD mode. Referring to FIG. 14, at time t0, hybrid vehicle 1 is performing regenerative braking with second MG 30 at a relatively high SOC of battery 60. This occurs when, for example, the driver releases the accelerator pedal during running at high speed.

Because the vehicle is coasting, the MG2 torque becomes negative in accordance with a change in the required driving force caused by the release of the accelerator pedal, resulting in a regenerative brake being applied. When running on a downhill, for example, the speed of the vehicle neither increases nor decreases because there is a balance between an acceleration component of gravity, and the MG2 torque and vehicle running resistance.

At time t1 when the SOC reaches a standby threshold SOCt, standby control is started. Standby threshold SOCt is a preset value for determining that the SOC has become close to a state where charging of battery 60 is to be restricted. In the example of FIG. 14, from time t1 to t2, the vehicle state is transitioning to a state where the engine rotation speed and the MG1 rotation speed are both 0 rpm, that is, a rotation speed synchronized state of clutch CS.

Figure 15:
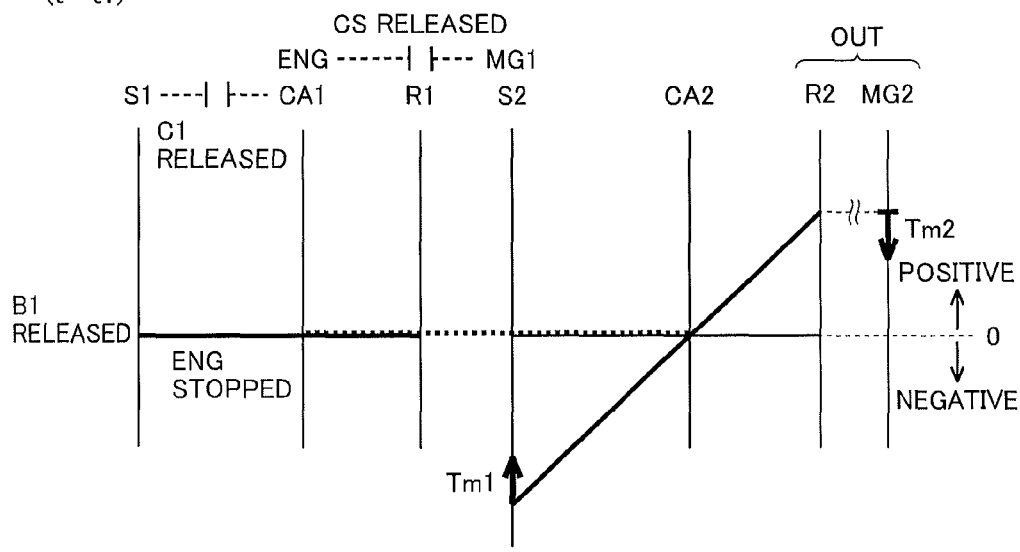
FIG. 15 is a nomographic chart showing a state of each rotation element at time t1 in FIG. 14.
Figure 16:
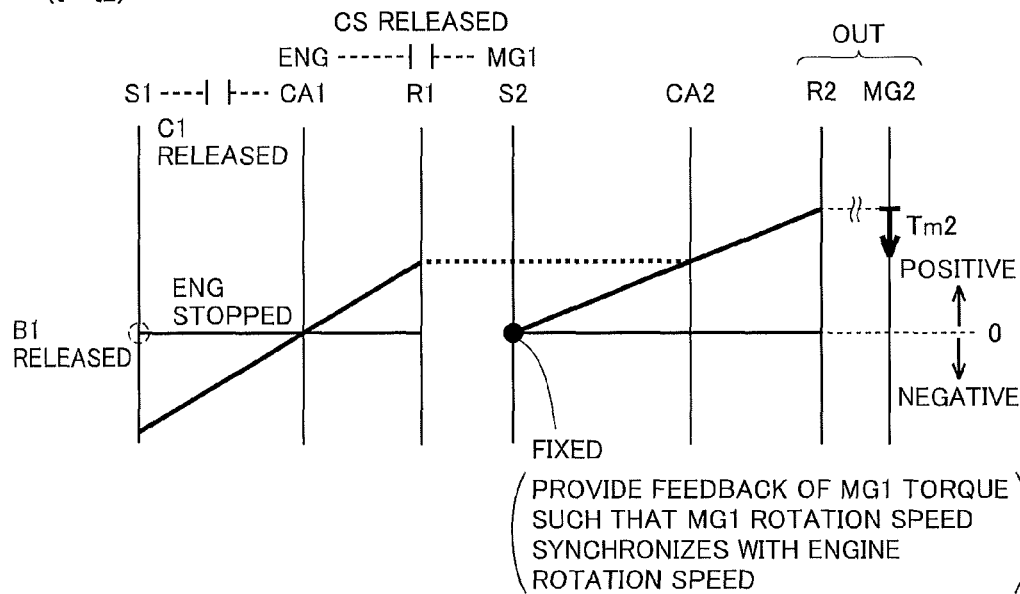
FIG. 16 is a nomographic chart showing a state of each rotation element at time t2 in FIG. 14.

FIG. 15 is a nomographic chart showing a state of each rotation element at time t1 in FIG. 14. FIG. 16 is a nomographic chart showing a state of each rotation element at time t2 in FIG. 14. In both FIGS. 15 and 16, clutches C1, CS and brake B1 are all in a released state. From time t1 to t2, MG1 torque Tm1 acts in the direction of the arrow shown. This increases the rotation speed of carrier CA2, and causes the rotation speed of MG1 to approach 0 rpm from a negative rotation speed. Then in transmission unit 40, as shown in FIG. 16, the rotation speed of ring gear R1 increases to cause a change in the rotation speed of each member. The state shown in FIG. 16 where the engine rotation speed and the rotation speed of first MG 20 are both 0 rpm corresponds to the rotation speed synchronized state of clutch CS.

Returning to FIG. 14, from time t2 to t3, MG1 torque Tm1 is returned to zero, while the working hydraulic pressure of clutch CS is increased. At time t3, clutch CS is engaged. Standby processing for operating the engine brake is now completed.

Then at time t4 when the SOC of battery 60 reaches an upper limit SOC for control, first MG 20 again outputs MG1 torque Tm1 for starting to crank the engine. This causes the engine rotation speed to increase from zero. At this time, engine torque Te is negative because a rotation resistance due to friction is generated by engine 10 in a fuel-cut state.

While the engine rotation speed increases, the rotation speeds of MG1, MG2, and engine 10 become equal at time t5, and thereafter at time t6 a stable state is attained where the engine brake is operated continuously.

Figure 17:
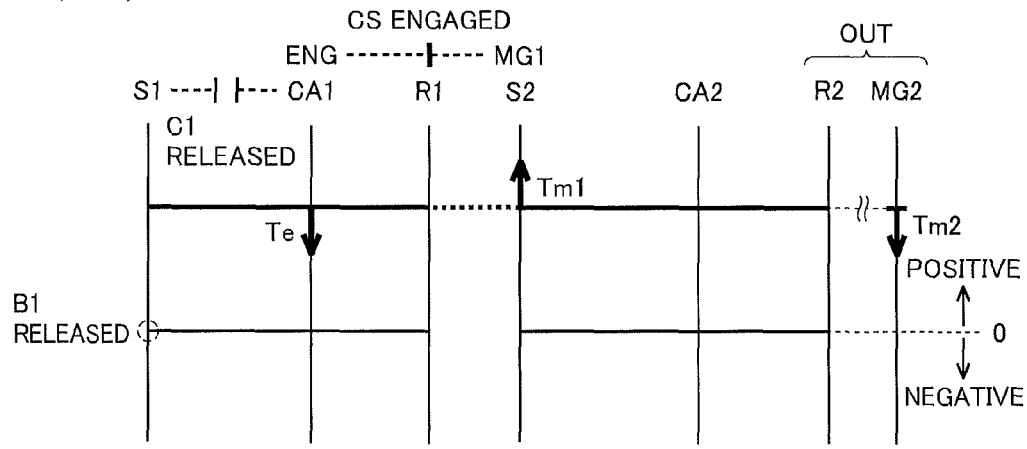
FIG. 17 is a nomographic chart showing a state of each rotation element at time t5 in FIG. 14.
Figure 18:
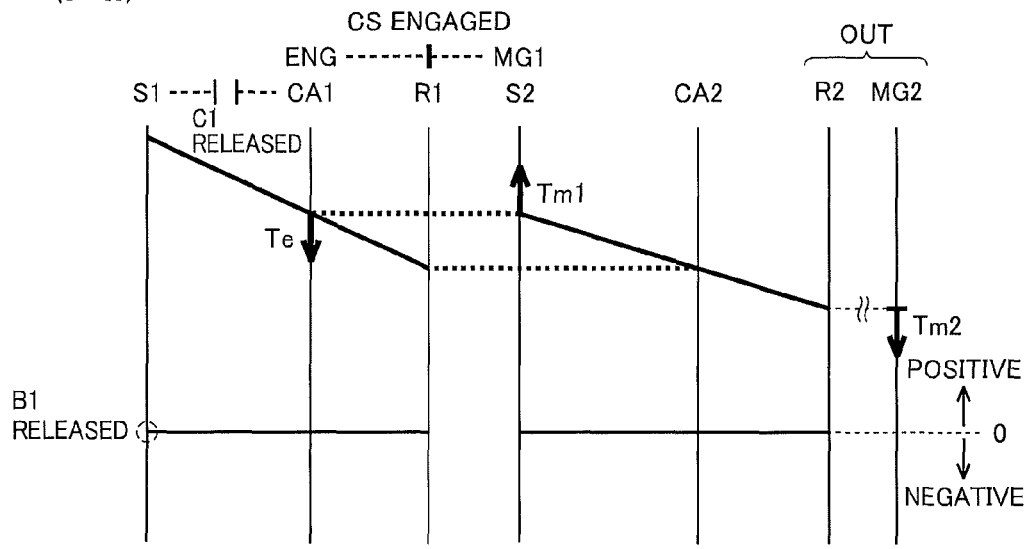
FIG. 18 is a nomographic chart showing a state of each rotation element at time t6 in FIG. 14.

FIG. 17 is a nomographic chart showing a state of each rotation element at time t5 in FIG. 14. FIG. 18 is a nomographic chart showing a state of each rotation element at time t6 in FIG. 14. In both FIGS. 17 and 18, clutch C1 and brake B1 are in a released state, and clutch CS is in an engaged state. In the state of FIG. 18, regenerative braking is performed by second MG 30, and the generated regenerative electric power is consumed by first MG 20 cranking the engine. Thus, after time t6, the SOC of battery 60 is maintained at a constant value without exceeding the upper limit SOC for control.

In the example shown in FIG. 14, because clutch CS has previously been engaged at time t3, the engine brake can be operated immediately after the SOC has reached the upper limit value for control at time t4. In particular, at low temperatures where the clutch response becomes poor, having clutch CS engaged previously allows the engine brake to be operated without a time lag.

Note that because the friction torque of the engine increases while the engine is in a cold state, the rotation resistance of the engine during fuel cut from time t4 to t6 is preferably reduced by using a variable valve timing (VVT) mechanism that can vary the opening/closing timing for intake valves. The variable valve timing mechanism may be returned to its original state after the engine rotation speed has reached a desired rotation speed.

Figure 19:
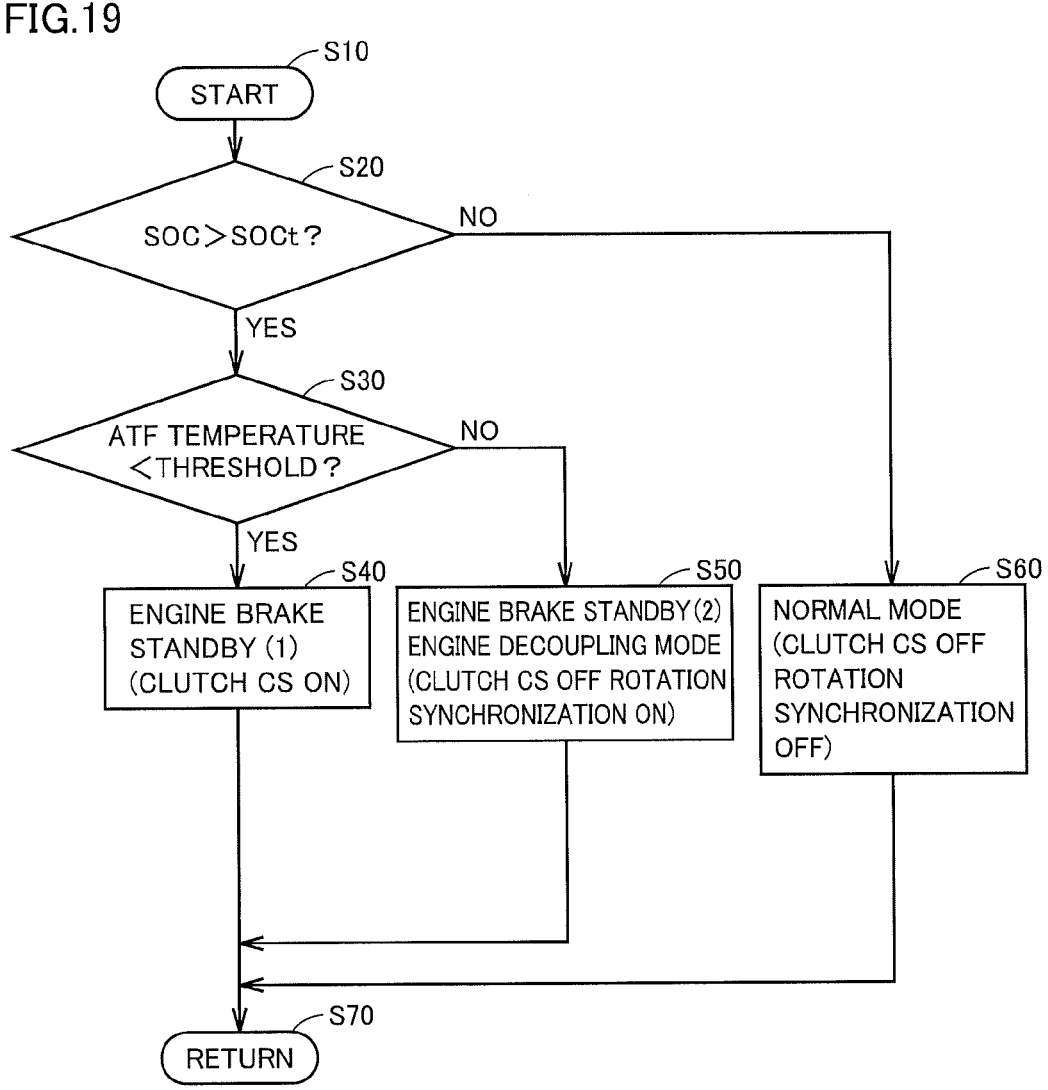
FIG. 19 is a flowchart for explaining engine brake standby control executed in a first embodiment.

FIG. 19 is a flowchart for explaining engine brake standby control executed in the first embodiment. The processing of this flowchart is executed during running in the CD mode when start processing of step S10 is invoked from a prescribed main routine at certain intervals, or every time a prescribed condition is met.

First, in step S20, it is determined whether or not the SOC of battery 60 is greater than determination threshold SOCt. Determination threshold SOCt is a prescribed value for determining that the SOC of battery 60 has become close to the upper limit value for control, and can be set based on the engagement element temperature of clutch CS or the AFT temperature, and the battery temperature or the shift range.

Figure 20:
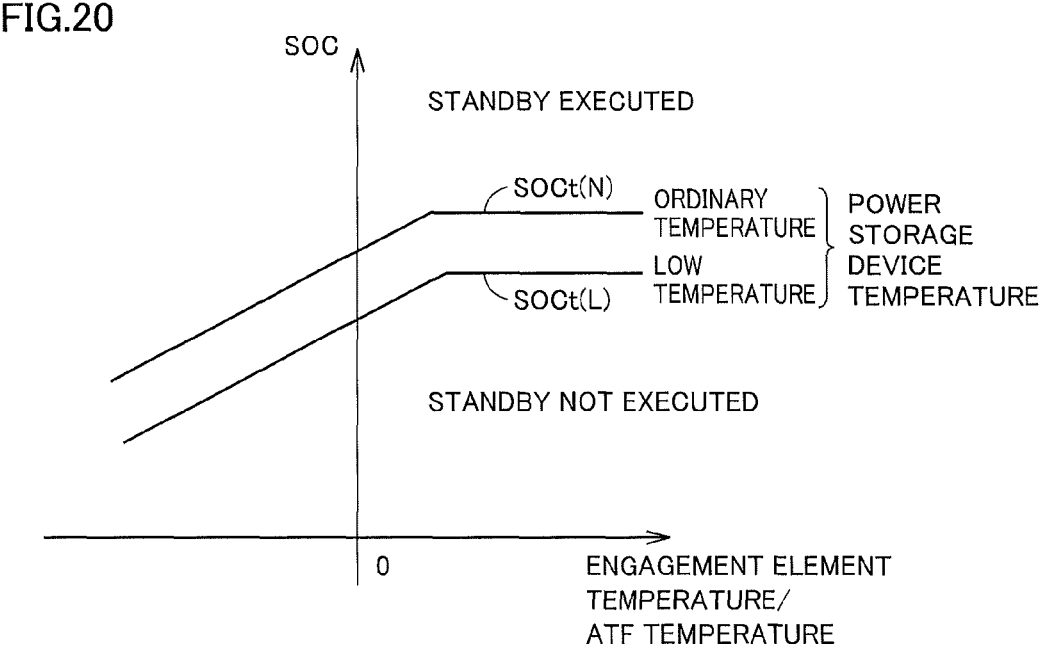
FIG. 20 is a diagram showing an example where a determination threshold SOCt is set based on a battery temperature.
Figure 21:
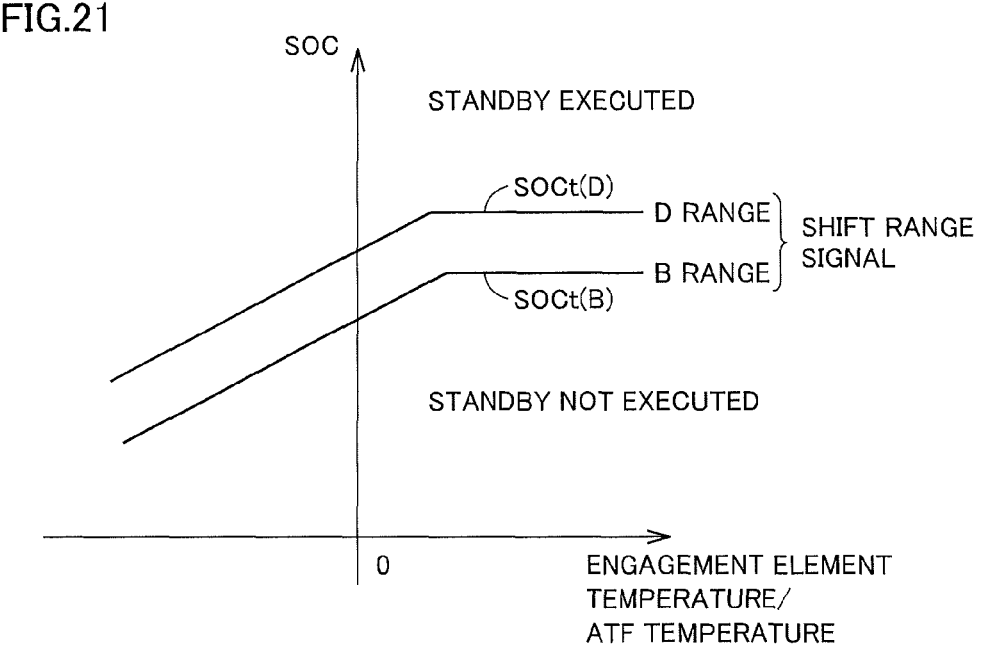
FIG. 21 is a diagram showing an example where the determination threshold SOCt is set based on a shift range.

FIG. 20 is a diagram showing an example where determination threshold SOCt is set based on the battery temperature. FIG. 21 is a diagram showing an example where determination threshold SOCt is set based on the shift range. In both FIGS. 20 and 21, the horizontal axis represents the engagement element temperature of clutch CS or the ATF temperature, and the vertical axis represents the SOC of battery 60. The standby processing for the engine brake is not executed in a range where the SOC is lower than the threshold, and is executed in a range where the SOC is higher than the threshold.

FIG. 20 shows a threshold SOCt (L) set for a case where the battery temperature is low and a threshold SOCt (N) set for a case where the battery temperature is ordinary temperature. Note that the ordinary temperature is a temperature higher than the low temperature, and SOCt (N)>SOCt (L).

FIG. 21 shows a threshold SOCt (D) set for a case where a shift range signal is the D range, and a threshold SOCt (B) set for a case where the shift range signal is the B range. Note that the B range is a range where the engine brake is operated at an earlier stage, and SOCt (D)>SOCt (B).

Returning to FIG. 19, where SOC>SOCt does not hold in step S20, the processing proceeds to step S60. In step S60, the vehicle runs in a normal mode (with clutch CS being released, and the rotation synchronization between the engine and MG1 being OFF). At this time, because there is still enough time until charging of battery 60 is to be restricted, an engine brake standby operation is not executed in the vehicle.

Where SOC>SOCt holds in step S20, the processing proceeds to step S30. In step S30, it is determined whether or not the ATF temperature is lower than the determination threshold.

Where ATF temperature<determination threshold does not hold in step S30, the processing proceeds to step S50, and where ATF temperature<determination threshold holds, the processing proceeds to step S40.

In step S40, an engine brake standby operation (1) is executed in the vehicle. Specifically, MG1 torque Tm1 is controlled such that the rotation speed of first MG 20 becomes zero, and clutch CS is engaged after rotation synchronization control for clutch CS is performed. Note that clutch CS may not be completely engaged, or alternatively, the clutch stroke may be shortened, or clutch CS may be semi-engaged. This allows the engine brake to be operated to increase the rotation speed of the engine with MG1 torque Tm1 immediately after the SOC of battery 60 has reached the upper limit value for control.

In step S50, an engine brake standby operation (2) is executed in the vehicle. Specifically, MG1 torque Tm1 is controlled such that the rotation speed of first MG 20 becomes zero, and rotation synchronization control for clutch CS is performed. Here, clutch CS is not engaged, and is brought into a released state. In this case, the work of the hydraulic pump for moving a piston of clutch CS is small, leading to less energy loss than that in the state in step S40.

After the processing of any of steps S40, S50, and S60 is completed, the processing proceeds to step S70 where the control is returned to the main routine. Note that if the SOC subsequently reaches the upper limit value for control, processing is executed in which the engine is rotated in an unignited state with torque Tm1 of first MG 20 (H4 in FIG. 4: engine brake in the series hybrid mode).

As described above, in this embodiment, the vehicle state is set to a standby mode when the state of battery 60 has become close to the state requiring the restriction of charging, so as to allow the engine brake to be operated immediately. This allows the engine brake to be responsively operated when the state of battery 60 has reached the state requiring the restriction of charging.

Note that although the flowchart of FIG. 19 illustrates the engine brake standby operation as a synchronization operation in which a rotation difference between the input and the output of clutch CS is adjusted, or as an engagement operation of clutch CS, the engine brake standby operation may include an operation in which the clutch stroke is shortened, and an operation in which the clutch is brought into a semi-engaged state. The engine brake standby operation may also include a mode change operation in which the EV running mode shown in FIG. 15 is changed to the EV running mode shown in FIG. 16.

[Second Embodiment]

In the first embodiment, the case has been described where the standby operation for the engine brake is executed in the configuration as shown in FIG. 1 in which the two rotation shafts of first MG 20 and second MG 30 are arranged in parallel, and transmission unit 40 is connected to engine 10.

In the second embodiment, a case where the standby operation for the engine brake is executed in another configuration will be described.

Figure 22:
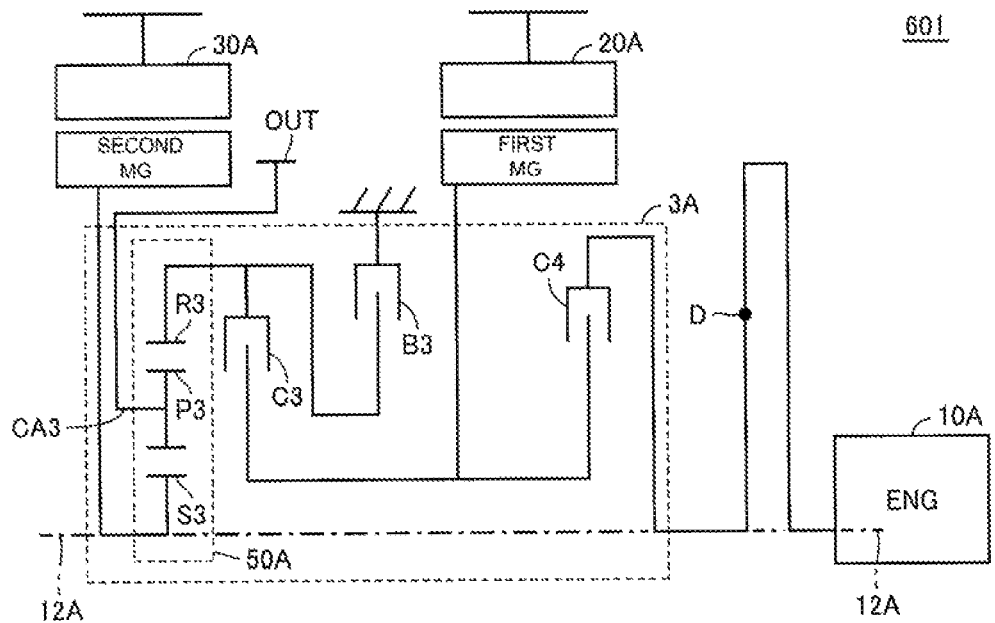
FIG. 22 is a diagram showing the configuration of a hybrid vehicle 601 according to a second embodiment.
Figure 23:
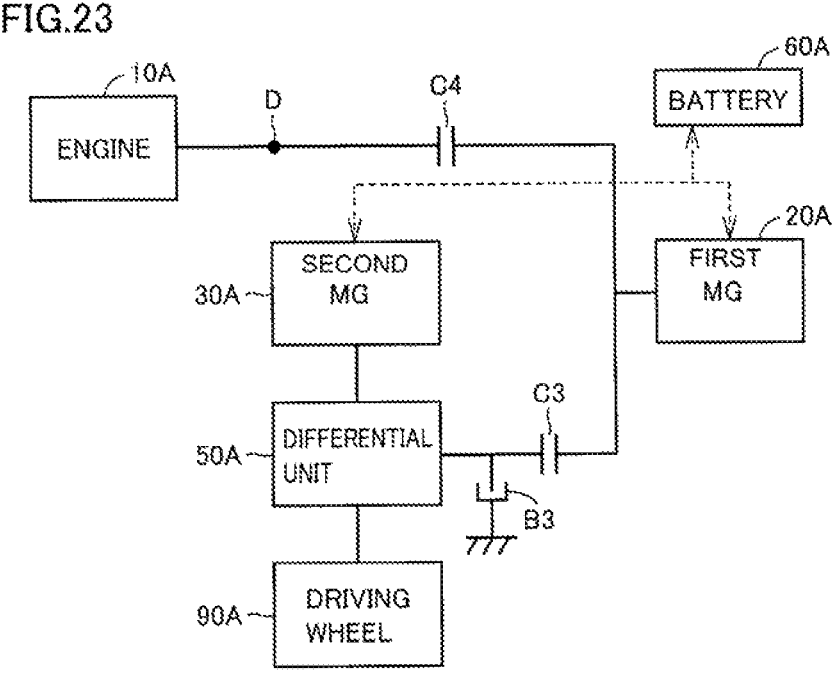
FIG. 23 is a block diagram showing a power transmission path between various components of the vehicle in FIG. 22 in simplified form.

FIG. 22 is a diagram showing the configuration of a hybrid vehicle 601 according to the second embodiment. In the configuration shown in FIG. 22, a portion symmetric with respect to rotation shaft 12A (lower half of the sheet) is omitted. FIG. 23 is a block diagram showing a power transmission path between various components of the vehicle in FIG. 22 in simplified form. Note that FIG. 22 is for comparison with FIG. 2. As shown in FIGS. 22 and 23, hybrid vehicle 601 includes engine 10, a first MG 20A, a second MG 30A, a power transmission unit 3A, and a driving wheel 90A. Power transmission unit 3A includes a differential unit 50A, a brake B3, and clutches C3, C4.

Engine 10A and clutch C4 are connected with a damper D therebetween. Clutch C4, when engaged, connects the rotation shaft of engine 10A and the rotation shaft of first MG 20A.

In the example shown in FIG. 22, differential unit 50A is a planetary gear mechanism configured with a sun gear S3, a ring gear R3, a pinion gear P3, and a carrier CA3. Clutch C3, when engaged, connects the rotation shaft of first MG 20A and the rotation element (ring gear R3) of differential unit 50A. Brake B3, when engaged, fixes the rotation speed of the rotation element (ring gear R3) of differential unit 50A to zero.

The rotation element (sun gear S3) of differential unit 50A is connected to the rotation shaft of second MG 30A. The rotation element (carrier CA3) of differential unit 50A is connected to driving wheel 90A via an output gear OUT.

As can be seen in FIGS. 22 and 23, when clutches C3, C4 are engaged and brake B3 is released, hybrid vehicle 601 can be operated in the series/parallel mode. Moreover, when clutch C4 and brake B1 are engaged and clutch C3 is released, hybrid vehicle 601 can be operated in the series mode. Furthermore, during EV running with the engine stopped, clutch C4 and brake B3 are released. During such EV running, clutch C3 is released for running with a single motor only, and clutch C3 is engaged for running with the two motors. In this way, the single motor running and the two motor running of EV running are implementable. These states will be described below with a table and a diagram in which these states are organized.

Figure 25:
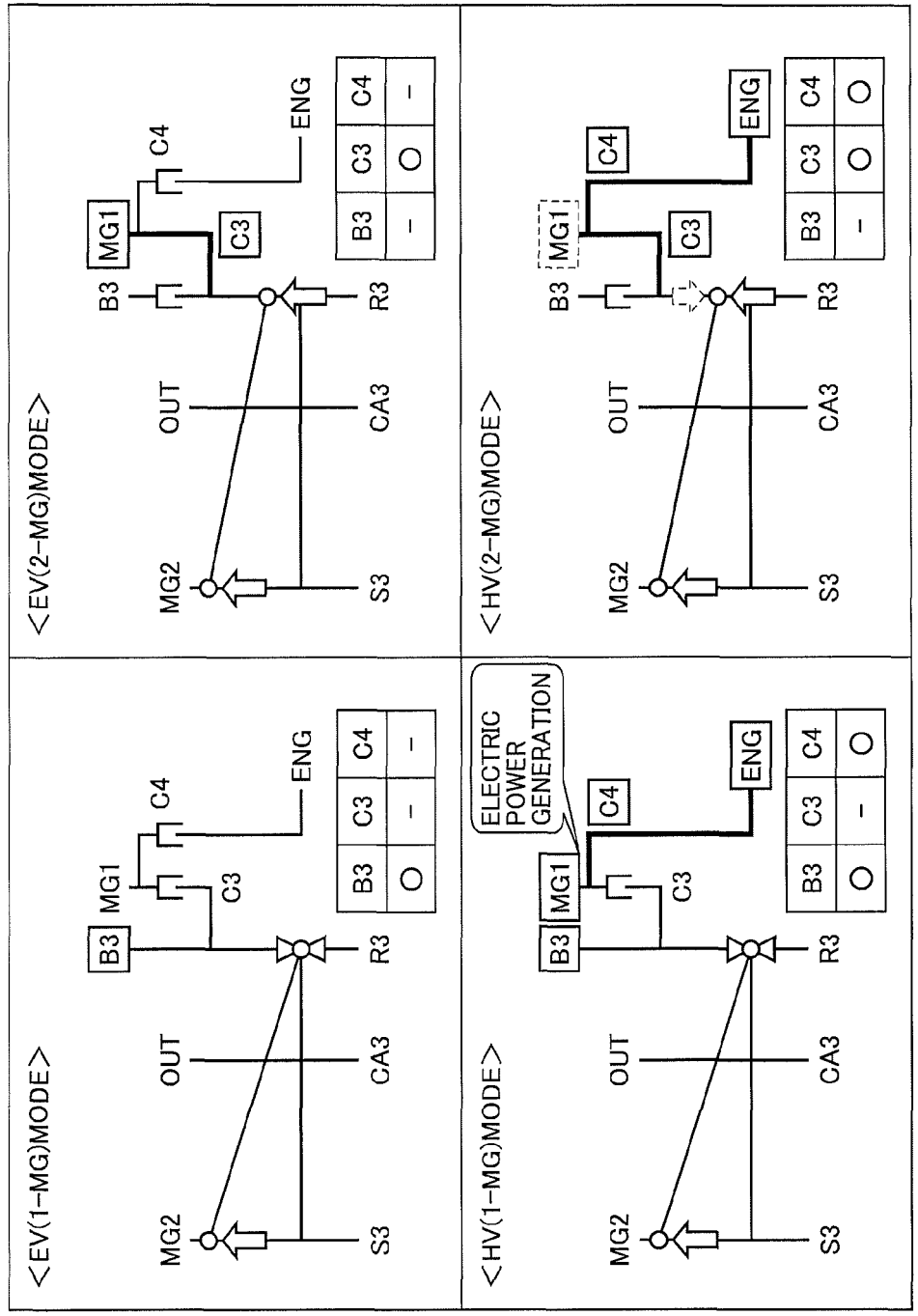
FIG. 25 is a diagram showing rotation states of the differential unit and engaged states of the engagement elements, in each running mode.

FIG. 24 is a diagram for explaining relations between running modes and engagement elements in hybrid vehicle 601. FIG. 25 is a diagram showing rotation states of the differential unit and engaged states of the engagement elements, in each running mode.

Referring to FIGS. 24 and 25, when the running mode is the EV (1-MG) mode, the operation of engine 10A is stopped, and second MG 30A is driven. The rotation speed of second MG 30A is reduced by the planetary gear mechanism (differential unit 50A) and transmitted to driving wheel 90A. Here, brake B3 is engaged, and clutches C3, C4 are released.

When the running mode is the EV (2-MG) mode, the operation of engine 10 is stopped, and first MG 20A and second MG 30A are driven. The rotation speed of each of these two motors can be selected for high total efficiency. Here, clutch C3 is engaged, and brake B3 and clutch C4 are released.

When the running mode is the HV (1-MG) mode, engine 10A is operated, and second MG 30A is driven. The rotation speed of second MG 30A is reduced by the planetary gear mechanism (differential unit 50A) and transmitted to driving wheel 90A. First MG 20A generates electric power with the rotation force of engine 10A. Here, a series HV operation is performed with brake B3 and clutch C4 being engaged, and clutch C3 being released.

When the running mode is the HV (2-MG) mode, engine 10A is operated, and first MG 20A and second MG 30A are driven. As shown in the nomographic chart (lower right) in FIG. 25, second MG 30A and engine 10A output a torque in a direction increasing the rotation of output gear OUT. First MG 20A generates a negative torque to adjust the rotation of output gear OUT, and generates electric power as required. Here, clutches C3, C4 are engaged, and brake B3 is released. Through this control, hybrid vehicle 601 can run in the series/parallel mode.

Similarly, in hybrid vehicle 601 with the configuration as described above, the engine brake can be operated under conditions in which charging of battery 60A is to be restricted, so as to produce a braking force without charging of battery 60A and using the friction brake provided on the wheel.

In hybrid vehicle 601, when the engine brake is to be operated, clutch C3 is released, and clutch C4 is engaged while driving wheel 90A and engine 10A are decoupled. A cranking operation for engine 10A is then performed by first MG 20A using regenerative electric power generated by second MG 30A. The states of the engagement elements at this time are the same as those in the HV (1-MG) mode in FIG. 24.

In the EV (1-MG) mode, because clutch C3 is in a released state, the same state as in the HV (1-MG) mode can be attained simply by engaging clutch C4. In contrast, in the EV (2-MG) mode, because clutch C3 is in an engaged state, the same state as in the HV (1-MG) mode cannot be attained unless clutch C3 is released, and brake B3 and clutch C4 are engaged.

From a comparison of the states of the engagement elements, therefore, it can be seen that the EV (1-MG) mode is more suitable than the EV (2-MG) mode for transferring the running mode to the state where the engine brake is to be operated. Thus, as the standby control for operating the engine brake during EV running, the running mode may be transferred to the EV (1-MG) mode at an early stage while the vehicle is running in the EV (2-MG) mode.

Figure 26:
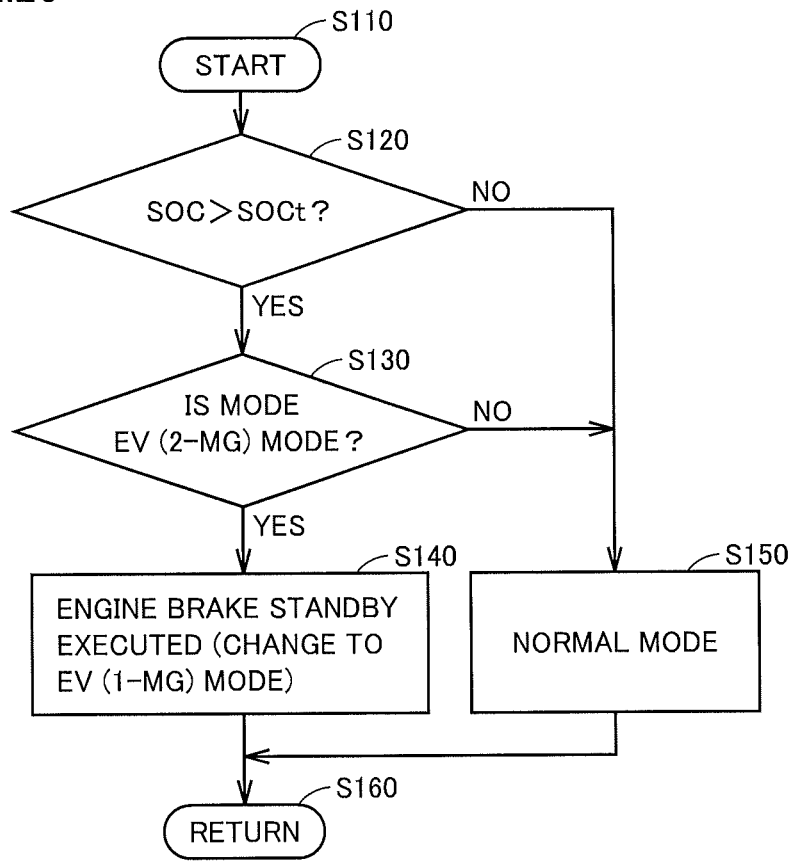
FIG. 26 is a flowchart for explaining engine brake standby control executed in the second embodiment.

FIG. 26 is a flowchart for explaining engine brake standby control executed in the second embodiment. The processing of this flowchart is executed during running in the CD mode or EV mode when start processing of step S110 is invoked from a prescribed main routine at certain intervals, or every time a prescribed condition is met.

First, in step S120, it is determined whether or not the SOC of battery 60A is greater than determination threshold SOCt. Determination threshold SOCt can be set based on the engagement element temperature of clutches C3, C4 or the ATF temperature, and the battery temperature or the shift range. A threshold similar to that described with FIGS. 20 and 21 may be used as determination threshold SOCt.

Where SOC>SOCt does not hold in step S120, the processing proceeds to step S150. In step S150, the vehicle runs in a normal mode (EV (1-MG) mode or EV (2-MG) mode set in accordance with the required driving force or the like). At this time, because there is still enough time until charging of battery 60A is to be restricted, the engine brake standby operation is not executed in the vehicle.

Where SOC>SOCt holds in step S120, the processing proceeds to step S130. In step S130, it is determined whether or not the running mode of the vehicle is the EV (2-MG) mode.

Where the running mode is not the EV (2-MG) mode in step S130, the processing proceeds to step S150. In this case, because the running mode is already the EV (1-MG) mode, the engine brake standby operation is not required. Where the running mode is the EV (2-MG) mode in step S130, the processing proceeds to step S140. In step S140, the engine brake standby operation is executed where the running mode is changed from the EV (2-MG) mode to the EV (1-MG) mode.

Subsequent to step S140 or S150, the processing proceeds to step S160 where the control is returned to the main routine.

Figure 27:
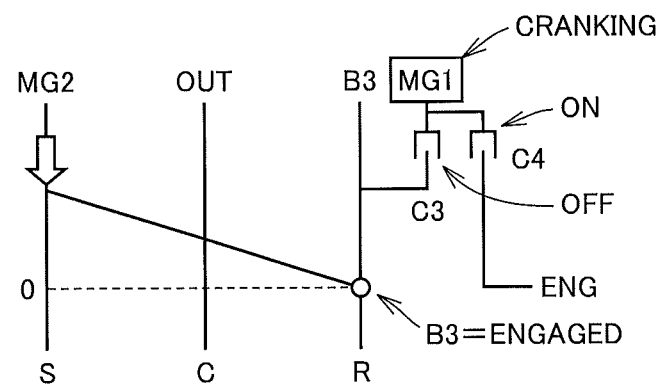
FIG. 27 is a diagram for explaining states of rotation elements of the differential unit and states of the engagement elements during an engine brake operation in hybrid vehicle 601.

FIG. 27 is a diagram for explaining states of rotation elements of the differential unit and states of the engagement elements during an engine brake operation in hybrid vehicle 601. Referring to FIG. 27, during the engine brake operation, engine 10A and first MG 20A are decoupled from output shaft OUT via clutch C3. Clutch C4 and brake B3 are engaged. In this way, the electric power generated by second MG 30A with the regenerative brake being operated can be consumed by causing first MG 20A to perform the cranking operation for the engine. A braking force can thus be produced without operating the friction brake on the wheel, and charging of the battery.

As described above, similarly in the second embodiment, the response of the engine brake can be enhanced by executing the standby operation in advance. Note that although the operation in which the EV running mode is changed has been described as an exemplary standby operation in the second embodiment, the operation in which the stroke of clutch C4 is shortened or the operation in which clutch C4 is semi-engaged or engaged may be executed as the standby operation, as in the first embodiment.

While embodiments of the present invention have been described as above, it should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A hybrid vehicle comprising:
   a power storage device;
   an internal combustion engine;
   a first motor generator;
   a second motor generator;
   a power transmission unit configured to switch a power transmission path between three rotation shafts of said internal combustion engine, said first motor generator, and said second motor generator; and
   a control device that controls said internal combustion engine, said first motor generator, said second motor generator, and said power transmission unit,
   said control device being configured such that, during execution of regenerative braking using at least one of said first motor generator and said second motor generator while said internal combustion engine is stopped, when a state amount indicating a state related to said power storage device has exceeded a prescribed amount, said control device executes a standby operation in which a state of said power transmission unit is brought from a current state closer to a state where regenerative electric power is generated by a rotating force of a wheel using said second motor generator, and said internal combustion engine in a fuel-cut state is rotated using said first motor generator, so as to allow said regenerative electric power to be consumed by said first motor generator,
   said prescribed amount being a preset value for determining that said state amount has become close to a state where charging of said power storage device is to be restricted.

2. The hybrid vehicle according to claim 1, wherein said power transmission unit includes:
   a transmission unit having an input element to which motive power is input from said internal combustion engine, and an output element from which the motive power input to said input element is output, said transmission unit being configured to switch between a non-neutral state where the motive power is transmitted between said input element and said output element and a neutral state where the motive power is not transmitted between said input element and said output element;
   a differential unit having a first rotation element connected to said first motor generator, a second rotation element connected to said second motor generator and said wheel, and a third rotation element connected to said output element, said differential unit being configured such that when a rotation speed of any two of said first to third rotation elements is set, a rotation speed of a remaining one rotation element is set; and
   a clutch configured to switch between an engaged state where the motive power is transmitted from said internal combustion engine to said first motor generator and a released state where transmission of the motive power from said internal combustion engine to said first motor generator is cut off, and wherein said control device brings said clutch closer to the engaged state from the released state as said standby operation.

3. The hybrid vehicle according to claim 1, wherein said state amount corresponds to charging electric power to said power storage device.

4. The hybrid vehicle according to claim 1, wherein said state amount corresponds to a state of charge of said power storage device.

5. The hybrid vehicle according to claim 2, wherein when a user is requesting an engine brake to be operated, said control device brings said clutch closer to the engaged state at an earlier stage than when a shift range is a D range.

6. The hybrid vehicle according to claim 2, wherein said standby operation includes a synchronization operation in which a rotation difference between an input and an output of said clutch is adjusted to zero.

7. The hybrid vehicle according to claim 2, wherein said standby operation includes an operation in which a stroke of said clutch is shortened.

8. The hybrid vehicle according to claim 2, wherein said standby operation includes an operation in which said clutch is brought into a semi-engaged state.

9. The hybrid vehicle according to claim 1, wherein said power transmission unit is configured to switch between a first EV running mode and a second EV running mode to cause the hybrid vehicle to run, said first EV running mode is a mode where the hybrid vehicle is caused to run using only a torque output from said second motor generator while said internal combustion engine is stopped, said second EV running mode is a mode where the hybrid vehicle is caused to run using a torque output from said first motor generator and the torque output from said second motor generator while said internal combustion engine is stopped, and when the hybrid vehicle is running in said second EV running mode, said control device controls said power transmission unit to switch a running mode of the hybrid vehicle to said first EV running mode from said second EV running mode, as said standby operation.

10. The hybrid vehicle according to claim 1, wherein said power transmission unit is configured to switch a running mode of said hybrid vehicle between a series mode and a series/parallel mode, said series mode is a mode where electric power is generated by said first motor generator using a driving torque of said internal combustion engine, and said wheel is rotated using a driving torque of said second motor generator, while said internal combustion engine and said first motor generator are decoupled from said second motor generator, and said series/parallel mode is a mode where said wheel is rotated using the driving torque of said internal combustion engine, a driving torque of said first motor generator, and the driving torque of said second motor generator, while motive power is transmitted between said internal combustion engine, said first motor generator, and said second motor generator.

11. The hybrid vehicle according to claim 1, wherein the control device comprises a hybrid vehicle electric control unit, a motor generator electric control unit, and an engine electric control unit, each of the hybrid vehicle electric control unit, the motor generator electric control unit, and the engine electric control unit including a computer.

* * * * *